United States Patent [19]

Nakashima et al.

[11] Patent Number: 6,091,863
[45] Date of Patent: Jul. 18, 2000

[54] IMAGE PROCESSOR AND DATA PROCESSING SYSTEM USING THE SAME PROCESSOR

[75] Inventors: Keisuke Nakashima, Hitachi; Jun Satoh, Musashino; Kazushige Yamagishi, Higashimurayama; Takashi Miyamoto, Tokyo; Kenichiro Omura, Kodaira; Koyo Katsura, Hitachioota; Mitsuru Watabe, Urizura-machi, all of Japan

[73] Assignee: Hitachi, Ltd., Tokyo, Japan

[21] Appl. No.: 08/523,509

[22] Filed: Sep. 1, 1995

[30] Foreign Application Priority Data

Sep. 2, 1994 [JP] Japan .................................. 6-209523

[51] Int. Cl.[7] .............................. G06K 9/36; G06K 9/54; G06F 15/00
[52] U.S. Cl. .......................... 382/307; 382/276; 345/508; 345/520; 395/800.01
[58] Field of Search .................................. 382/307, 276; 395/502, 508, 517, 800.01, 580; 358/426; 345/508, 520

[56] References Cited

U.S. PATENT DOCUMENTS

| | | | |
|---|---|---|---|
| 4,654,804 | 3/1987 | Thaden et al. | 345/185 |
| 4,694,351 | 9/1987 | Nakamura et al. | 358/426 |
| 4,947,342 | 8/1990 | Katsura et al. | 345/436 |
| 5,046,023 | 9/1991 | Katsura et al. | 345/434 |
| 5,369,744 | 11/1994 | Fukushima et al. | 395/502 |
| 5,469,398 | 11/1995 | Scott et al. | 365/221 |
| 5,548,740 | 8/1996 | Kiyohara | 395/427 |
| 5,655,114 | 8/1997 | Taniai et al. | 395/580 |

FOREIGN PATENT DOCUMENTS 61-261969  11/1986  Japan .

OTHER PUBLICATIONS

Electronic Technology, 1993, No. 10, pp. 24–28.

*Primary Examiner*—Phuoc Tran
*Assistant Examiner*—Daniel G. Mariam
*Attorney, Agent, or Firm*—Antonelli, Terry, Stout & Kraus, LLP

[57] ABSTRACT

An image processor which is connected to a system bus that connects a processor for forming graphic command related to image processing to a main memory that holds command and original image data, and draws image on the frame buffer based upon said graphic command from said processor, wherein said graphic processor has a data bus change-over unit which connects said system bus to a first data bus that is connected to a graphic data memory holding said graphic command and said original image data, or connects said first data bus to a frame buffer which holds the data to be displayed. The image processor realizes a high-speed processing at a reduced cost by using a graphic memory bus coupled to a graphic processor.

20 Claims, 22 Drawing Sheets

EQUAL SCALE

EXPANSION

CONTRACTION

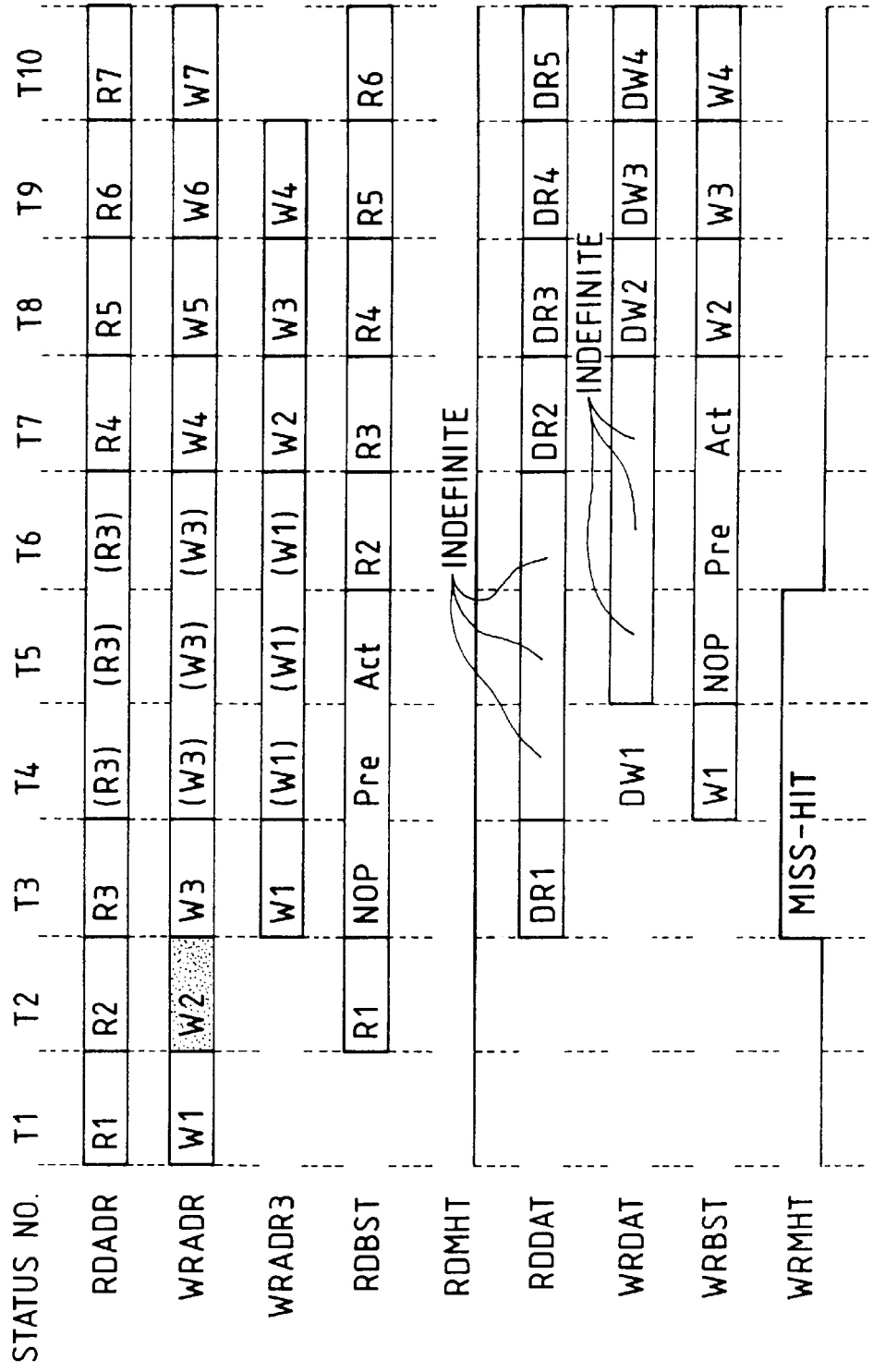

IMAGE PROCESSOR AND DATA PROCESSING SYSTEM USING THE SAME PROCESSOR

FIELD OF THE INVENTION

The present invention relates to an image data processing system for processing image, text and graphic data assigned to memories in a field of data terminal equipment such as personal computers, work stations, facsimiles, printers and graphic apparatuses. More specifically, the invention relates to a high-speed image data processing system for accessing memories at high speeds in synchronism with clocks.

BACKGROUND OF THE INVENTION

A graphic system has heretofore been known which is connected to a processor bus, and in which image data are drawn on a frame buffer based upon instructions from a processor and are displayed on a CRT.

A conventional image data processing system used in a graphic work station where processing must be executed at high speeds, uses a large-capacity processor and a VRAM (dynamic memory with serial port) as a large-capacity memory as disclosed in PIXEL No. 129, pp. 26–34.

Furthermore, a synchronous DRAM has been developed to substitute for an expensive VRAM, and system employing a low-speed graphic apparatus has been described in Electronic Technology, 1993, No. 10, pp. 24–28.

As shown in Japanese Patent Laid-open No. 261969/1986, an image processing system that has heretofore been employed in a facsimile, a printer and a graphic device is employing a high-speed SRAM (static memory) for local processing that makes reference to peripheral pixels and a DRAM (dynamic memory) as a large-capacity memory for storing code data and font data.

In a conventional graphic system in which the graphic processor is connected to a system bus such as a processor, it is not allowed to execute the texture mapping which is necessary for the three-dimensional display at high speeds since the bus speed is low.

In a conventional high-speed image data processing system, furthermore, a special memory is necessary to maintain high performance inviting, however, a serious problem from the standpoint of offering the apparatus at a reduced price. In the conventional image processing system, furthermore, the fact that the two kinds of memories cannot be combined together is a serious bottleneck in the constitution from the standpoint of realizing the device in a small size and in the form of an Large Scale Integration chip "(LSI)".

SUMMARY OF THE INVENTION

The object of the present invention is to provide, at a reduced cost, a graphic processor which processes and draws image data stored in a memory at high speeds, and reads and displays the data.

As for a system for constituting a processor, furthermore, the integration and distribution of processing must be traded off in order to realize the highest throughput with a minimum of hardware. For this purpose, the inventors have studied the method of arranging the memory buses for coupling the processor and the memory together.

As a memory control system, furthermore, a memory for high-speed processing and a large-capacity memory must be integrated to realize memory access of large capacity at high speeds and at a reduced cost. Concretely speaking, a system is constituted using an SDRAM (synchronous DRAM) as a memory that has a function for latching address, data and control signal in synchronism with clock.

By utilizing the SDRAM, an address that is to be accessed is issued to the memory and, then, a clock timing for producing, for example, read data is designated, making it possible to issue a next address before the read processing is completed.

However, the addresses that can be continuously issued are confined to the same line addresses. To access different line addresses with the same bank, a miss-hit processing such as precharge processing is required.

Another object of the present invention is to provide a method of arranging processors and a method of controlling memories and, particularly, to provide constitution for realizing miss-hit processing at a reduced cost and at high speeds.

A feature of the present invention resides in an image processor which is connected to a system bus that connects a processor for forming graphic command related to image processing to a main memory that holds command and original image data, and draws image on the frame buffer based upon the graphic command from the processor, wherein said graphic processor has a data bus change-over unit which connects said system bus to a first data bus that is connected to a graphic data memory which holds the graphic command and the original image data, or connects the first data bus to a frame buffer which holds the data to be displayed.

Another feature of the present invention resides in a data processing system comprising:

a processor for forming graphic command related to image processing;

a main memory for holding program, command and original image data;

a graphic processor for drawing image on the frame buffer based upon the graphic command from the processor;

a system bus for connecting the processor, the main memory and the graphic processor together;

a graphic data memory which is connected to said graphic processor, and holds the graphic command and the original image data;

a frame buffer for holding the data to be displayed;

a first data bus that connects the graphic processor to the graphic data memory; and a second data bus that connects the graphic processor to the frame buffer;

wherein the graphic processor has a data bus change-over unit that connects the first data bus to the system bus or connects the first data bus to the second data bus.

That is, a bus switch is provided to change over the data bus which transfers commands and original image data from the processor to the local memory and the data bus which reads the data from the local memory and draws the data onto the frame buffer, in order to realize high-speed processing by directly connecting the local memory which is different from the frame memory to the graphic processor, the local memory temporarily storing the commands and original image data from the processor.

The processor is constituted by a command fetch by DMA control, a side operation unit, a straight line operation unit and a pixel operation unit. The data control unit, side operation unit and straight line operation unit execute the processing through a pipeline.

In an embodiment of the present invention, furthermore, the side operation unit is constituted by more than eleven operation units DDA (digital differential analyzers) that chiefly execute subtractions, and the linear operation unit is constituted by more than five DDAs.

By using a plurality of SDRAMs, furthermore, the highest throughput is realized by a pipeline processing in which a processing is executed and image data are written while reading the command and original picture data. Accordingly, three independent memory buses are arranged to couple the processors to the memories, the command and input data are stored in the first memory, and the second and third memories are used as substitute buffers and from which different memories are read out by the display processing while the data are being written by the draw processing.

Besides, the mode of processing is different between the drawing processor and the display processor, and it is allowed to change the burst length which represents the number of data read at one time from the memory at the time of accessing the memory. Concretely speaking, the drawing processor is used with a burst length 1 and the display processor is used with a burst length 8.

Furthermore, a system is constituted by a means for picking up a line address from a write address in a drawing processor and an address of an address-generating means that detects miss-hit in a read address, a means for storing the line address for every memory access, a means for comparing the line address that is stored with a current line address, and a means which informs a bus control unit of a miss-hit when the result of comparison is different, and whereby provision is made of a bus control unit which updates row address of the memory, i.e., effects precharge processing and activates the row address, and a double miss-hit processing is executed when a miss-hit is detected in either the write address or the read address in order to hold image processing pipeline.

Provision of a local memory makes it possible to read the data at a high speed from the local memory using an exclusive bus at the time of processing the drawing and, hence, to realize high-speed processing compared with when a command is transferred by being connected to the system bus of the processor.

The processor is constituted by a command fetched by a data control unit, a side operation unit, a straight line operation unit and pixel operation unit. The data control unit, side operation unit and straight line operation unit are operated through a pipeline, and the side operation unit is constituted by eleven or more DDAs and the straight line operation unit is constituted by five or more DDAs, in order to realize a maximum throughput with a minimum processing based on a minimum of hardware.

By pipeline-processing the data using a plurality of memory buses, furthermore, it is allowed to realize a high-speed processing at a low cost without having buffer memory in the processor.

By changing the burst length depending upon the draw processing and display processing, furthermore, miss-hit in the display is minimized, the processing time is shortened, and the consumption of electric power is decreased.

In writing the drawing data, furthermore, miss-hit in the write address is detected in advance. When the read address is miss-hit, therefore, the pipeline for image data processing is supported by a decreased amount of hardware.

DETAILED DESCRIPTION OF THE EMBODIMENTS

An embodiment of the present invention will now be described with reference to the drawings.

Figure 21:
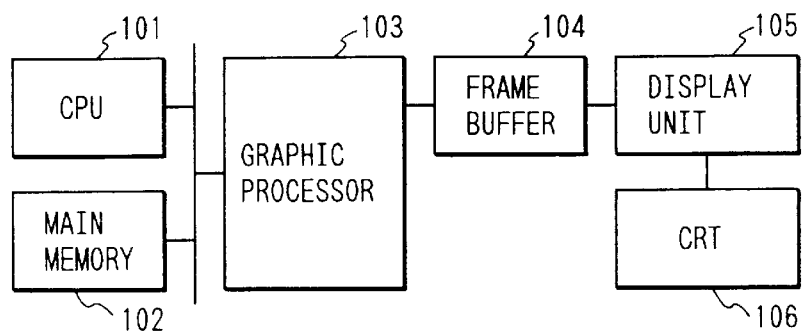
FIG. 21 is a block diagram schematically illustrating a conventional graphic system.

FIG. 21 is a diagram which schematically illustrates the constitution of a conventional graphic system, wherein a CPU 101 issues a draw processing to a graphic processor 103 by using instruction and data in a main memory 102. In response to this instruction, the graphic processor 103 draws image onto a frame buffer 104. A display unit 105 reads the data representing the completion of image drawing from the frame buffer 104 and displays it on a CRT 106. If a DRAM (VRAM) with a parallel-serial converter for display is used as the frame buffer 104, the drawing of image and its display can be executed simultaneously. However, VRAM is so expensive that in a low-cost system, it is generally accepted practice to constitute the frame buffer 104 using the DRAM, to draw the image and to read the displayed data in a time-shared manner by using a bus between the graphic processor 103 and the frame buffer, and to display the data from the graphic processor 103 on the CRT 106.

In this conventional graphic system in which the graphic processor is connected to a system bus such as CPU, however, the bus speed is so slow that a texture mapping necessary for the three-dimensional display could not be executed at a high speed.

In a conventional high-speed image data processing system, furthermore, a special memory is needed to maintain high performance imposing a serious problem from the standpoint of providing the apparatus at a reduced cost.

In the conventional image processing system, furthermore, the fact that the above two kinds of memories cannot be combined together is a serious bottleneck in the constitution from the standpoint of realizing the device in a small size and in the form of an LSI.

Figure 22:
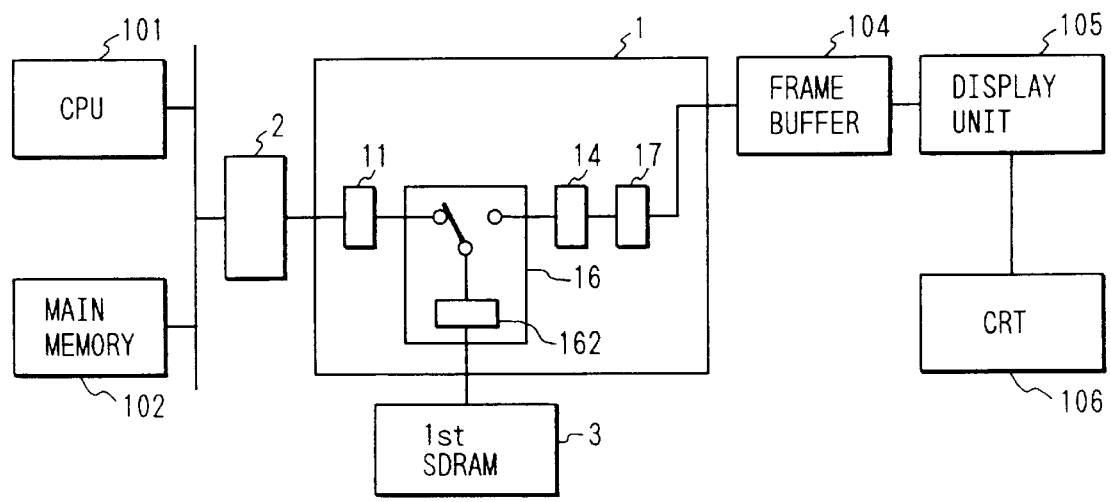
FIG. 22 is a block diagram schematically illustrating a graphic system according to the present invention.

FIG. 22 is a block diagram which schematically illustrates an embodiment of the present invention for solving the above-mentioned problem. That is, a high-speed processing is realized by directly coupling a local memory 3 which is different from the frame buffer 104 to the graphic processor 1 to temporarily store commands and image data from the CPU 101.

For this purpose, provision is made of a bus control unit 16 having a bus switch 162 to switch a data bus that transfers the commands and image data from the CPU 101 to the local memory 3 and a data bus that draws image on the frame buffer 104 while reading the data from the local memory 3. Owing to the provision of the local memory 3, the high-speed processing is realized since the data can be read at a high speed from the local memory 3 during the draw processing by using a dedicated bus compared with when the system bus is connected to the CPU 101 to transfer the command.

Figure 1:
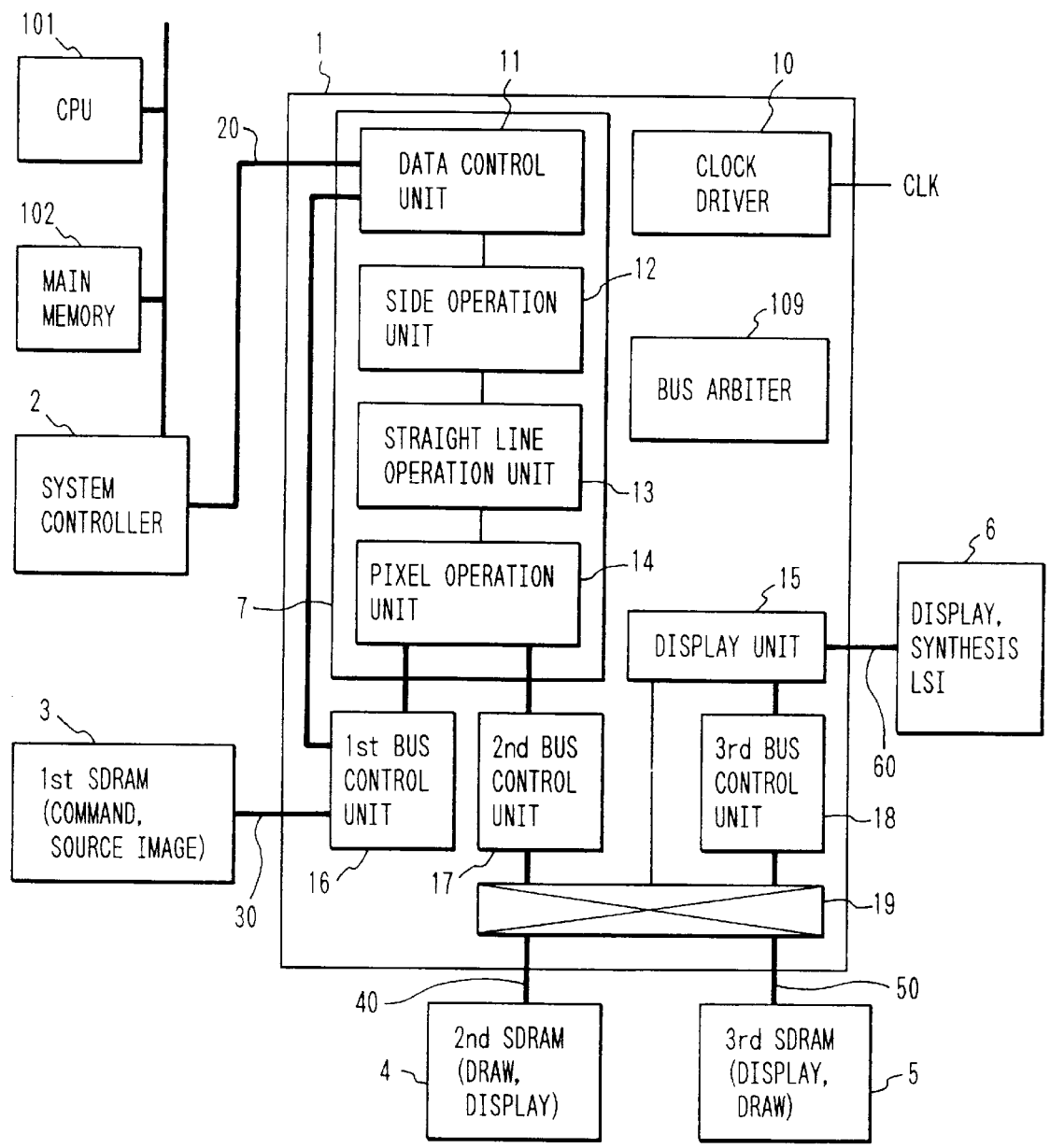
FIG. 1 is a block diagram illustrating an embodiment of the present invention.

An embodiment of the present invention will now be described with reference to a block diagram of FIG. 1 on the basis of the data flow. By using the main memory 102, the CPU 101 prepares a list of instructions to the graphic processor 1 and transfers the command and input data to be processed to a synchronous DRAM 3 by using a system controller 2 and via a data control unit 11. The system controller 2 is a DMA controller and transfers the data in the main memory 102 to the graphic processor 1 based on an instruction from the CPU. Thereafter, the system controller 2 issues an execution start command to the graphic processor 1. Upon receiving the execution start command, the data control unit 11 in the graphic processor 1 takes out a command from the synchronous DRAM 3, transfers required parameters to a side operation unit 12, a straight line operation unit 13 and a pixel operation unit 14, and drives the side operation unit 12.

The side operation unit 12 calculates coordinates in which input data are stored and calculates draw coordinates with an end point as a unit, and drives the straight line operation unit 13. The straight line operation unit 13 calculates coordinates where input data are stored and calculates draw coordinates with a dot as a unit and gives an instruction to the pixel operation unit 14 which processes the data. The pixel operation unit 14 takes out input data from the synchronous DRAM 3, processes the data, and draws image on either a synchronous DRAM 4 or a synchronous DRAM 5 via a bus control unit 17 and a change-over switch 19. On which one of them the image should be drawn first is determined depending upon a state after the resetting. Of the synchronous DRAM 4 and synchronous DRAM 5, the memory on which no image is drawn reads the data from a display unit 15 via a bus control unit 18 and a change-over switch 19, and transfers the data to a display synthesizing LSI 6 via a display output bus 60.

In this embodiment, the graphic processor 1 is formed on a singe semiconductor board, i.e., in the form of a single-chip LSI to lower the cost. This LSI has a bus 20 that connects to the system controller 2, a bus 30 that connects to the first synchronous DRAM 3, a bus 40 that connects to the second synchronous DRAM 4, a bus 50 that connects to the third synchronous DRAM 5, and a bus 60 that connects to the display synthesizing LSI 6. The LSI can be held in a flat package having 168 pins. This is accomplished as a result of limiting the widths of the bus to 16 bits.

Figure 23:
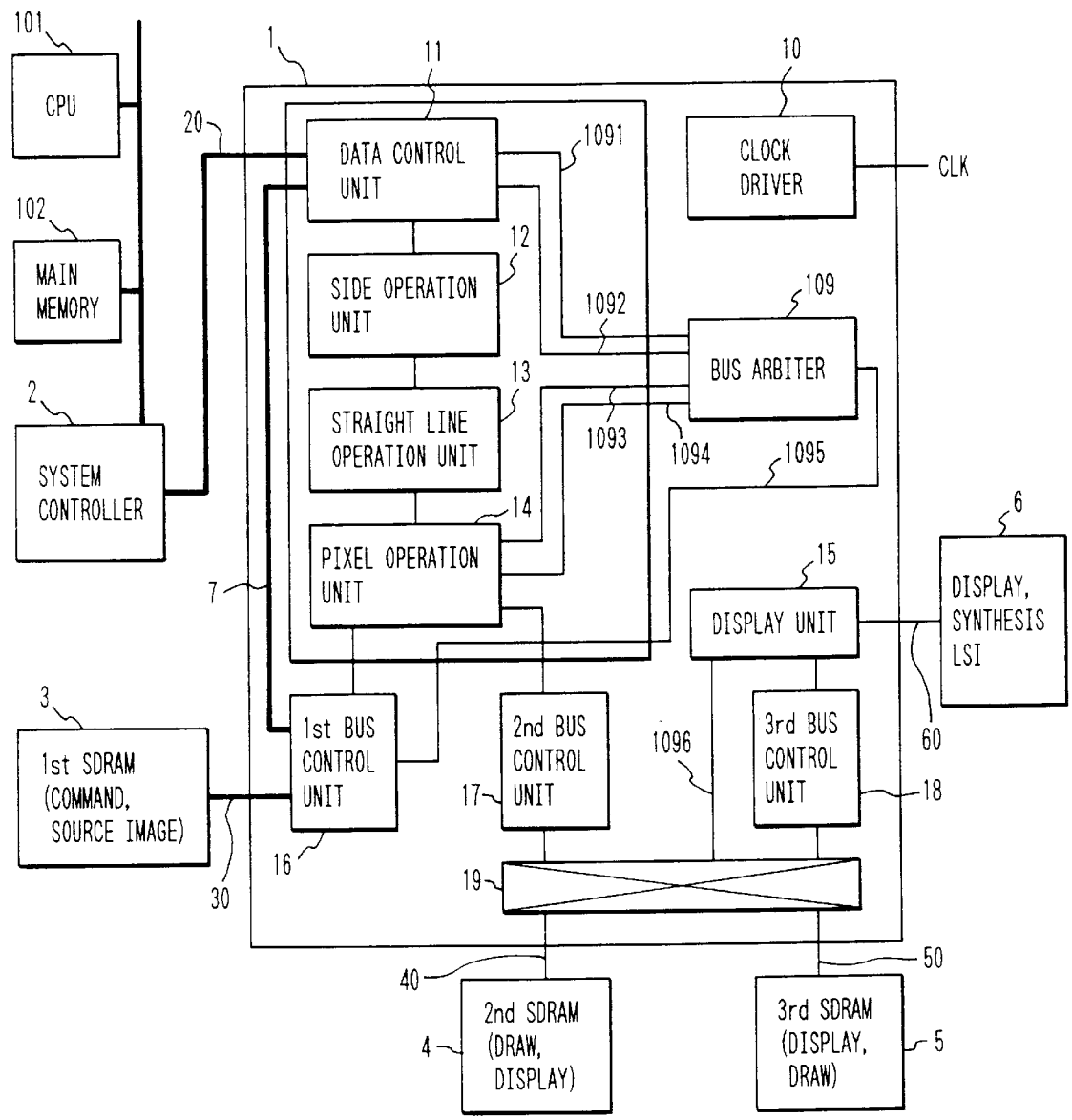
FIG. 23 is a block diagram of an embodiment of the present invention.

FIG. 23 is a block diagram illustrating an embodiment of the present invention which is based on a control flow.

The bus control unit 16 is accessed by a control signal from the system controller 2 via the data control unit 11. On the other hand, the pixel operation unit 14 requests to read the pixel data from the bus control unit 16. These operations are arbitrated by a bus arbiter 109. That is, both the data control unit 11 and the pixel operation unit 14 send bus requests to the bus arbiter 109 which judges their priority and issues a bus specification permit signal to only one of them.

In order to continuously write the data, the bus control units 16 and 17 updates the line address, i.e., share miss-hit data for detecting the occurrence of delay in the data due to miss-hit, etc. Accordingly, even when the data of one side are delayed, the data of the other side is waited for to execute the processing without destroying the pipeline in the image processing.

The change-over switch 19 is controlled based on a vertical synchronizing signal VSYNC of the display unit, but can also be controlled based upon an instruction from the CPU.

Figure 24:
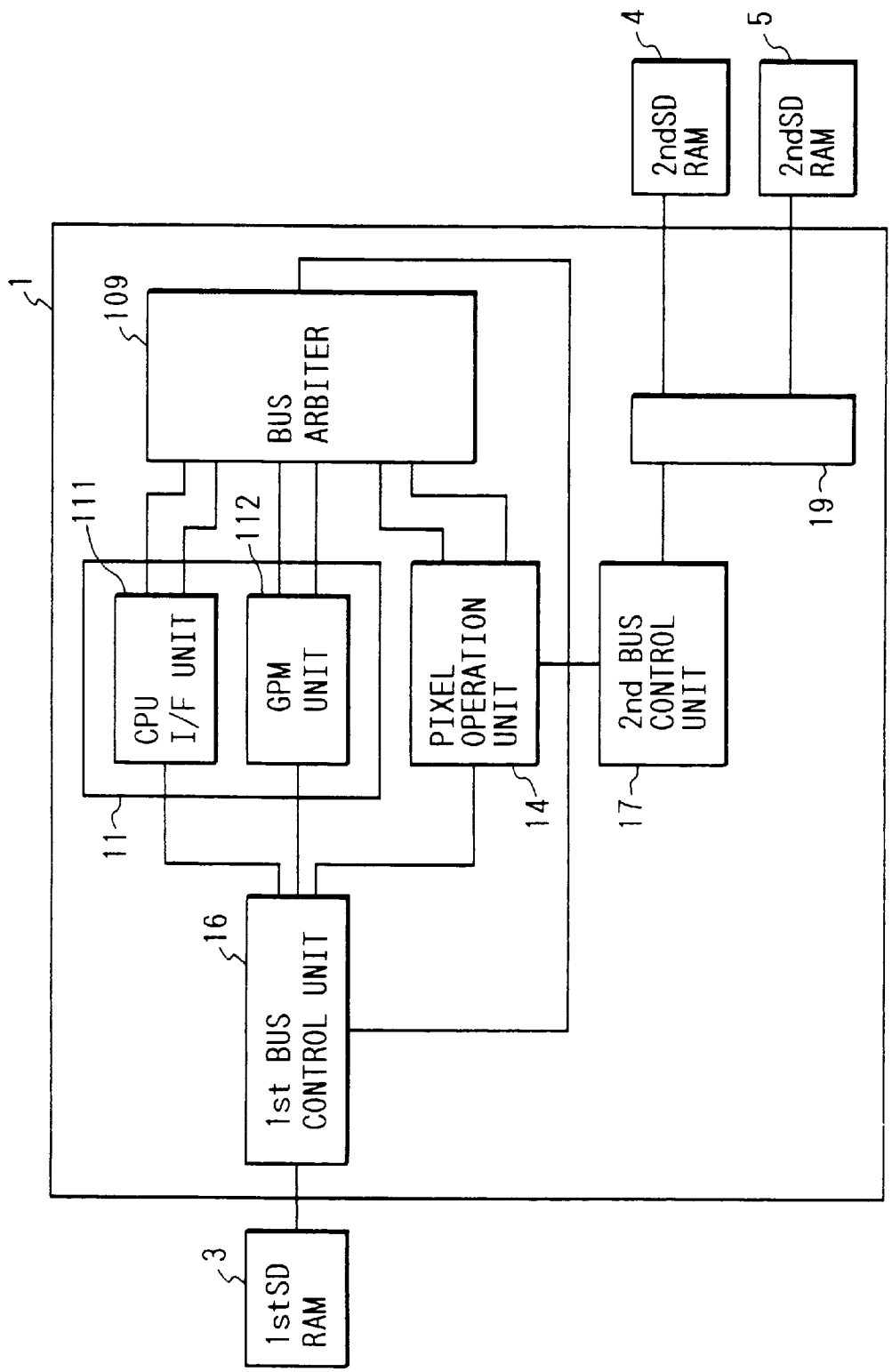
FIG. 24 is a block diagram of a bus arbitration control.

FIG. 24 is a block diagram which illustrates the bus arbitration control in further detail. In FIG. 23, the data control unit 11 was explained as a single block in order to simplify the description. In practice, however, the data control unit 11 has two functions of a CPU interface unit 111 and a graphic control unit 112. The CPU interface unit 111 realizes a function for writing command and image data input from the external system controller 2 into the first synchronous DRAM 3 or a function for writing the data from the first synchronous DRAM 3 and transferring them to the system controller 2. The graphic control unit 112 sets parameters to the processing units such as side operation unit 12, straight line operation unit and pixel operation unit 14 that read command from the first synchronous DRAM 3 and execute draw processing. The CPU interface unit 111, graphic control unit 112 and pixel operation unit 14 independently issue signals to request bus specification permission to the bus arbiter 109. Only one of them having the highest priority is selected and establishes a data path for changing-over the switch in the bus control unit 16.

Figure 2:
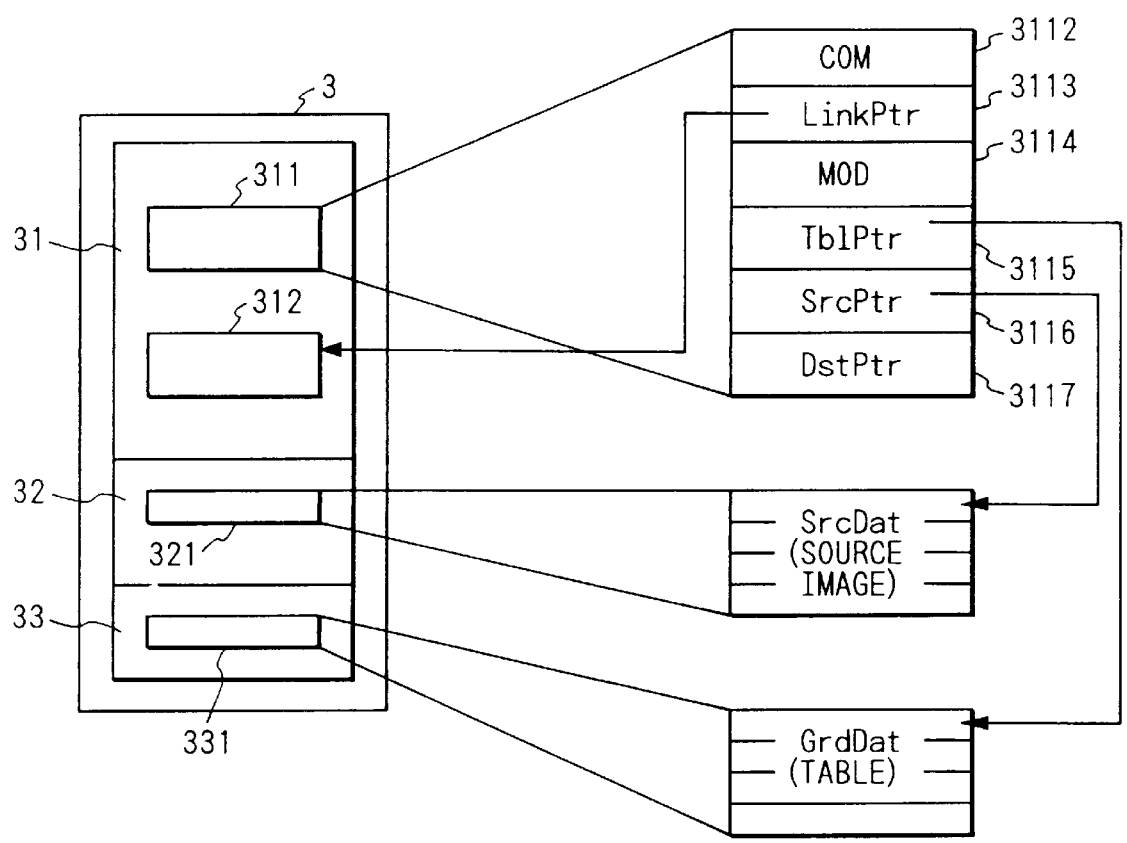
FIG. 2 is a memory map of a synchronous DRAM.

FIG. 2 illustrates data stored in the synchronous DRAM 3. A plurality of commands such as command lists 311 and 312 are stored in a command area 31. The content of a command list includes a command code 3112, a link pointer 3113, a mode designation 3114, a table pointer 3115, an input data pointer 3116 and a draw coordinate pointer 3117. The command code 3112 represents the kind of command. In the link pointer 3113 is stored a command start address which designates a command that should be executed next when the command now being processed is finished. In the mode designation 3114 is described an attribute which indicates what kind of image processing be executed in the pixel operation unit 14. The table pointer 3115 stores a head address of a table 331 that expresses glow shading and other attributes used for the image processing, and is used for being loaded onto an internal processing table from the synchronous DRAM 3 prior to starting the processing. The input data pointer 3116 represents an address in which are stored the input data, i.e., image data 321 of before being processed. The draw coordinate pointer 3117 describes coordinate values concerning at which positions the processed data be drawn.

Figure 3:
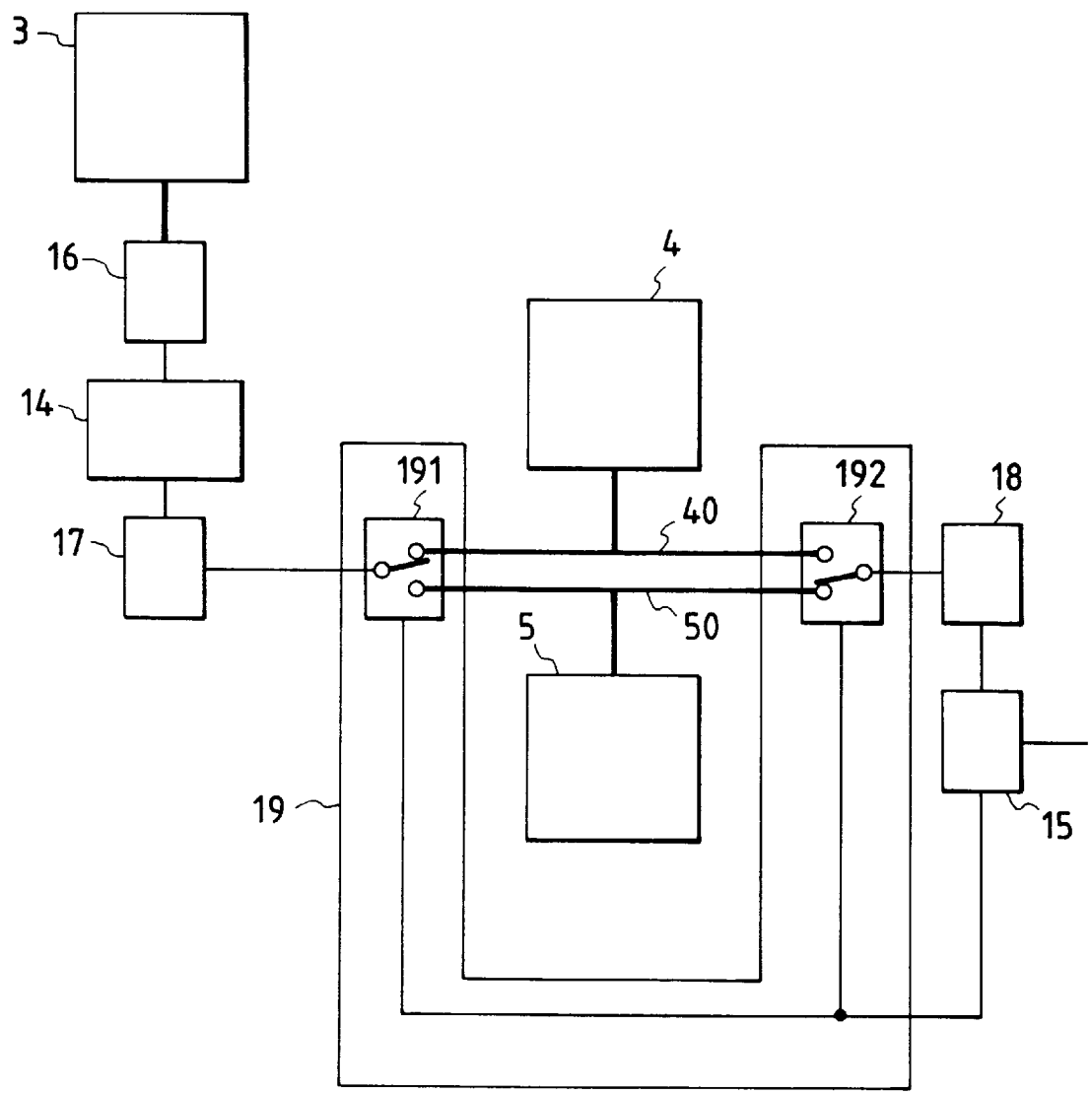
FIG. 3 illustrates the flow of data between the synchronous DRAMs.

FIG. 3 is a diagram illustrating a method of utilizing the synchronous DRAM 4 and the synchronous DRAM 5. The data read out from the synchronous DRAM 3 pass through the bus control unit 16, processed through the pixel operation unit 14, pass through the bus control unit 17, and are changed over by a switch 191 in the change-over switch 19 so as to access either the synchronous DRAM 4 or the synchronous DRAM 5. In FIG. 3, the data are connected to the synchronous DRAM 4 passing through the memory bus 40. In the synchronous DRAM 5 is stored the image that has been drawn already, and the data are fed to the display unit 15 through memory bus 50, switch 192 and bus control unit 18.

Figure 4:
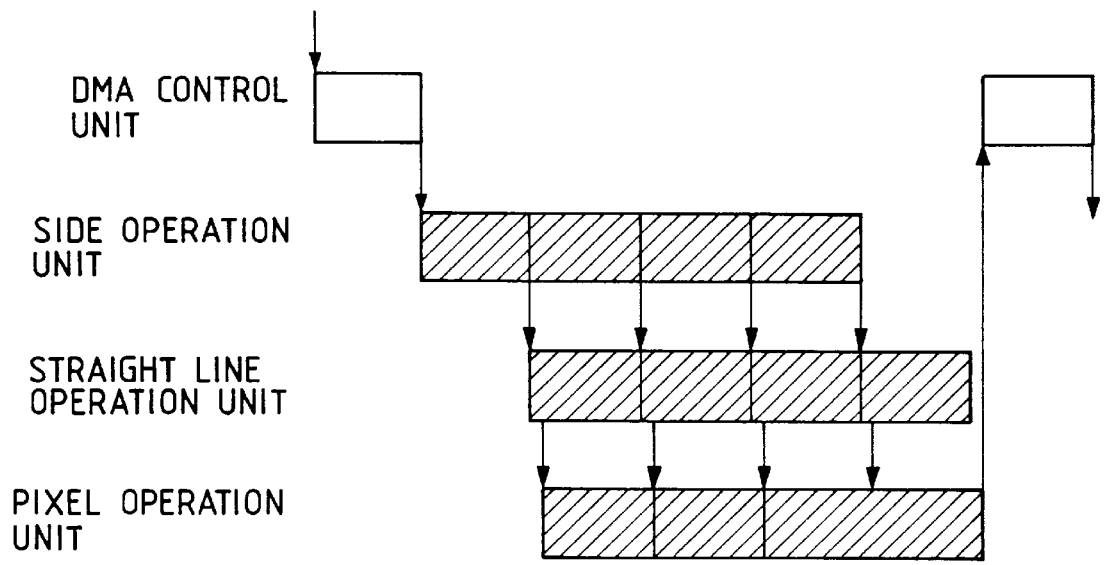
FIG. 4 is a chart illustrating the pipeline operation of a drawing processor.

FIG. 4 illustrates the pipeline operation of the draw processor 7. The data control unit 11 fetches the commands and sets parameters. After the parameters are set, a side operation start signal is sent to the side operation unit 12 to start the calculation of end point coordinates in the line copy processing. Upon receiving this signal, the side operation unit 12 starts the arithmetic operation. After the command is interpreted, the side operation of the first line copy is executed, and the data are set to the straight line operation unit 13. After the side operation of the first line copy is finished, a straight line operation start signal is sent to the straight line operation unit 13, followed by the start of side operation of a next line copy and operation for storing the result of side operation. The side operation unit 12 may operate a start point and an end point of a next line copy before the operation of one time of line copy is finished by the straight line operation unit 13.

Upon receiving a straight line operation start signal, the straight line operation unit 13 starts the straight line operation, and executes straight line operation of one pixel in one cycle. The straight line operation unit 13 outputs to the pixel operation unit a carry signal which is the result of DDA operation for every cycle. At the same time, a main access start signal is output to the pixel operation unit 14.

Upon receiving the memory access start signal, the pixel operation unit 14 starts access to the synchronous DRAMs. After the final pixel of the draw command is processed, a final pixel processing end signal is sent to the data control unit 11 to end the processing of a draw command. In response to this signal, the draw command fetch unit starts fetching a next draw command.

The draw algorithm called texture mapping will be described prior to explaining the blocks.

Figure 5A:
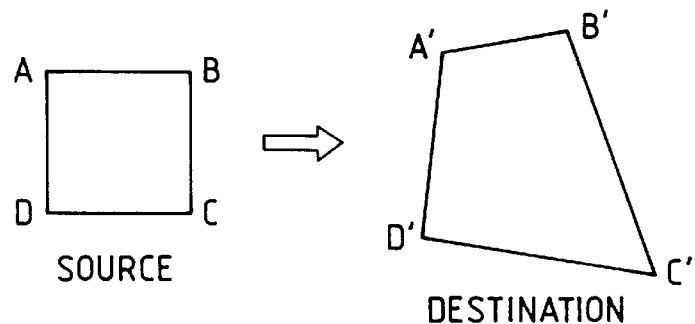
FIG. 5 is a diagram schematically illustrating a texture mapping.

The texture mapping is a primitive image operation for expanding, contracting and turning the image. As shown in FIG. 5(a), this is, usually, defined as a function for mapping a rectangular source image ABCD into any square shape A'B'C'D'.

Figure 5B:
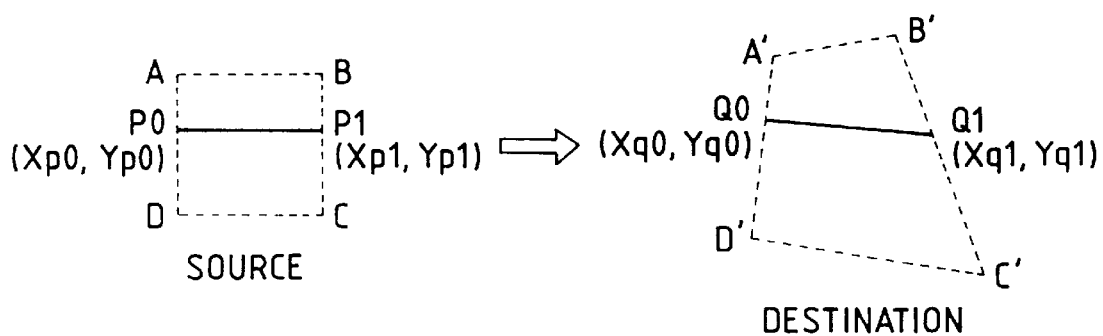

The data processor of the present invention is based on a system which realizes the texture mapping by executing line copy a plural number of times. The line copy is a primitive image operation according to which, as shown in FIG. 5(b), horizontal pixel sequences $P0(X_{p0}, Y_{p0})$–$P1(X_{p1}, Y_{p1})$ are mapped into any straight lines $Q0(X_{q0}, Y_{q0})$–$Q1(X_{q1}, Y_{q1})$ on a destination space.

According to the data processor of the present invention, the above-mentioned texture mapping is realized using seven DDAs. Among the seven DDAs, five DDAs are used for finding a start point Q0 and an end point Q1 of a line copy and two DDAs are used for finding a straight line connecting Q0 and Q1. In the data processor of the present invention, the former arithmetic operation is defined as side operation and the latter arithmetic operation is defined as straight line operation.

Figure 6:
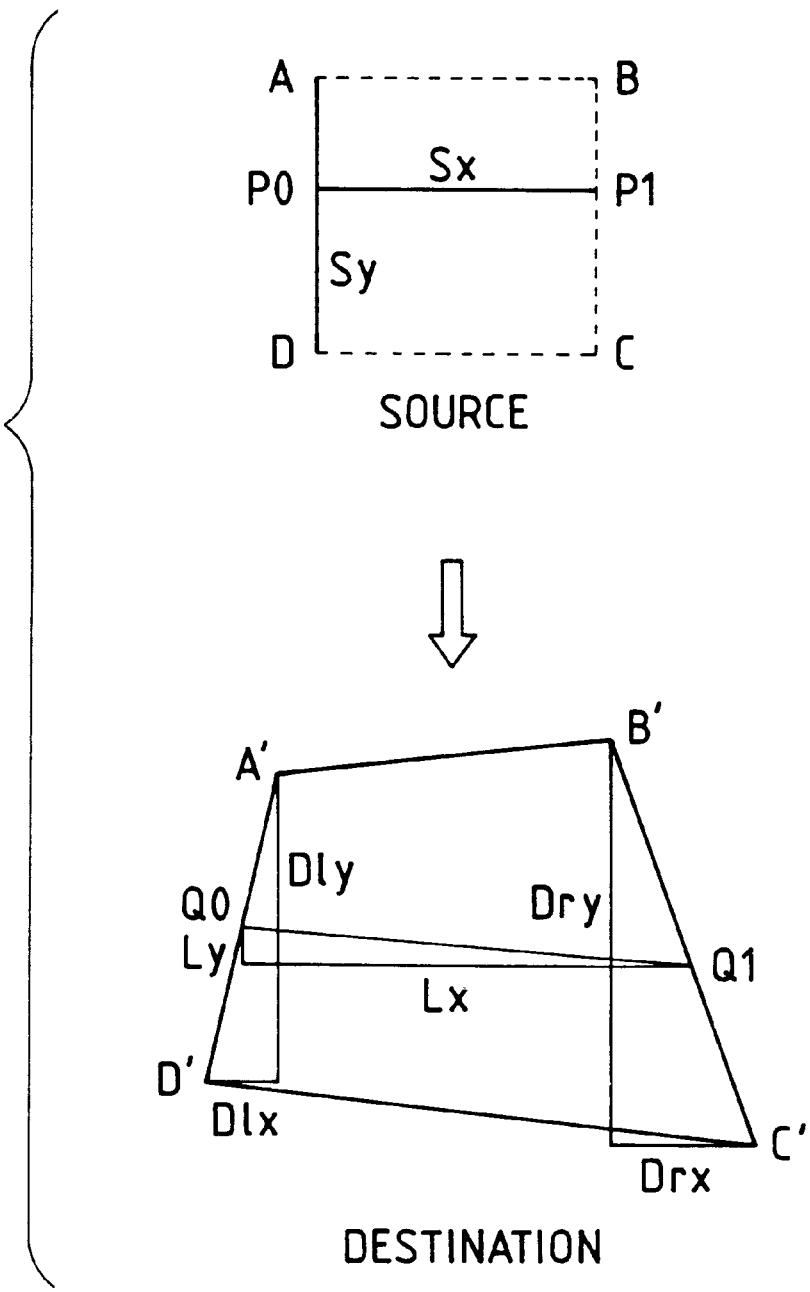
FIG. 6 illustrates the definition of parameters in the texture mapping.

The roles of the seven DDAs will now be described with reference to FIG. 6 which illustrates the case where the destination image is greater than the source image, i.e., where the image is expanded. The case where the destination image is smaller than the source image is defined to be contraction.

The first DDA is the one for performing the side operation, i.e., the one for the inter-pixel distance Sy of the source image in the Y-direction and for a component MAXEDGE (Dry in FIG. 6) having a maximum inter-pixel distance between the X-direction components Drx, Dlx or the Y-direction components Dry, Dly of the right and left sides of the destination image. This DDA performs the operation based on either one of the two interpixel distances which is longer (Dry in FIG. 6).

The second DDA is the one for performing the side operation, i.e., the one for MAXEDGE and an X-direction component Drx or for a Y-direction component Dry (Dry in FIG. 6) having a maximum inter-pixel distance of the right side of the destination image. This DDA performs the operation based on MAXEDGE.

The third DDA is the one for performing the side operation, i.e., the one for MAXEDGE and for an X-direction component Dlx or for a Y-direction component Dly (Dly in FIG. 6) having a maximum inter-pixel distance of the left side of the destination image. This DDA performs the operation based on MAXEDGE.

The fourth DDA is the one for performing the right side operation based on an 8-coupled pixel method, i.e., the one for an X-direction component Drx and for a Y-direction component Dry of the right side of the destination image. This DDA performs the operation based on either one of the two inter-pixel distances which is longer (Dry in FIG. 6).

The fifth DDA is the one for performing the left side operation based on an 8-coupled pixel method, i.e., the one for an X-direction component Dlx and for a Y-direction component Dly of the left side of the destination image. This DDA performs the operation based on either one of the two inter-pixel distances which is longer (Dly in FIG. 6).

The sixth DDA is the one for performing the straight line operation, i.e., the one for an inter-pixel distance Sx of the source image in the X-direction and for a component MAX-LINE (Lx in FIG. 6) having a maximum inter-pixel distance between an X-direction component Lx and a Y-direction component Ly of a straight line connecting a start point Q0 and an end point Q1 of the destination image found by the side operation. This DDA performs the operation based on either one of the two inter-pixel distances which is longer (Lx in FIG. 6).

The seventh DDA is the one for performing the linear operation based on a 4-coupled pixel method, i.e., the one for an X-direction component Lx and a Y-direction component Ly of a straight line connecting the start point Q0 and the end point Q1. This DDA performs the operation based on either one of the two inter-pixel distances which is longer (Lx in FIG. 6).

Here, the digital differential analyzing method DDA is to find coordinates of a straight line constituted by two variables a and b relying upon the operation of integers. It is now presumed that there are two variables a and b with the amounts of displacement being n and m, wherein n<m. It is further presumed that a difference between the displacement of a and the true displacement dn (real number) of a relative to the displacement of b is an error e. In this case, when the variable b is displaced by 1, then, dn becomes $0 \leq dn < 1$. The true displacement dn is added to the error e every time when b is displaced by 1. Then, the error e becomes greater than 1, and carry takes place. At this moment, it is regarded that a is displaced by 1. The DDA repeats the above-mentioned operation and detects the displacement of a relative to the displacement of b.

Described below is the structure of a texture mapping draw algorithm of the data processor of the present invention.

According to the data processor of the present invention, the texture mapping draw algorithms are classified, depending upon the functions, into three, i.e., a side operation algorithm, a straight line operation algorithm and a pixel copy algorithm.

Figure 7:
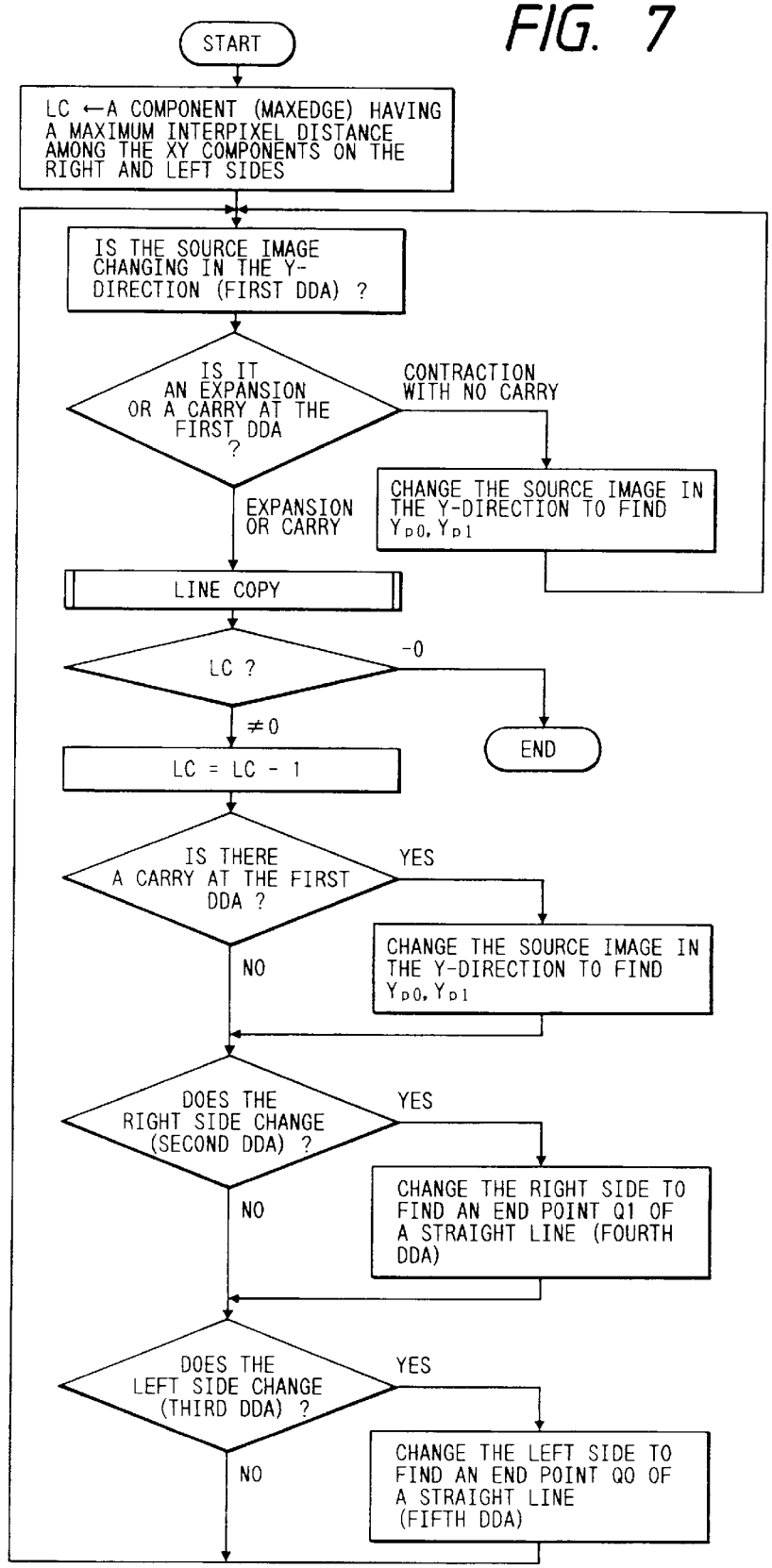
FIG. 7 illustrates an algorithm for side operation.

The side operation algorithm is the one for operating left side and right side coordinates of destination. That is, the first to fifth DDAs are executed in compliance with a flow chart shown in FIG. 7 to find coordinates of a start point Q0 and an end point Q1 of the line copy.

Figure 8:
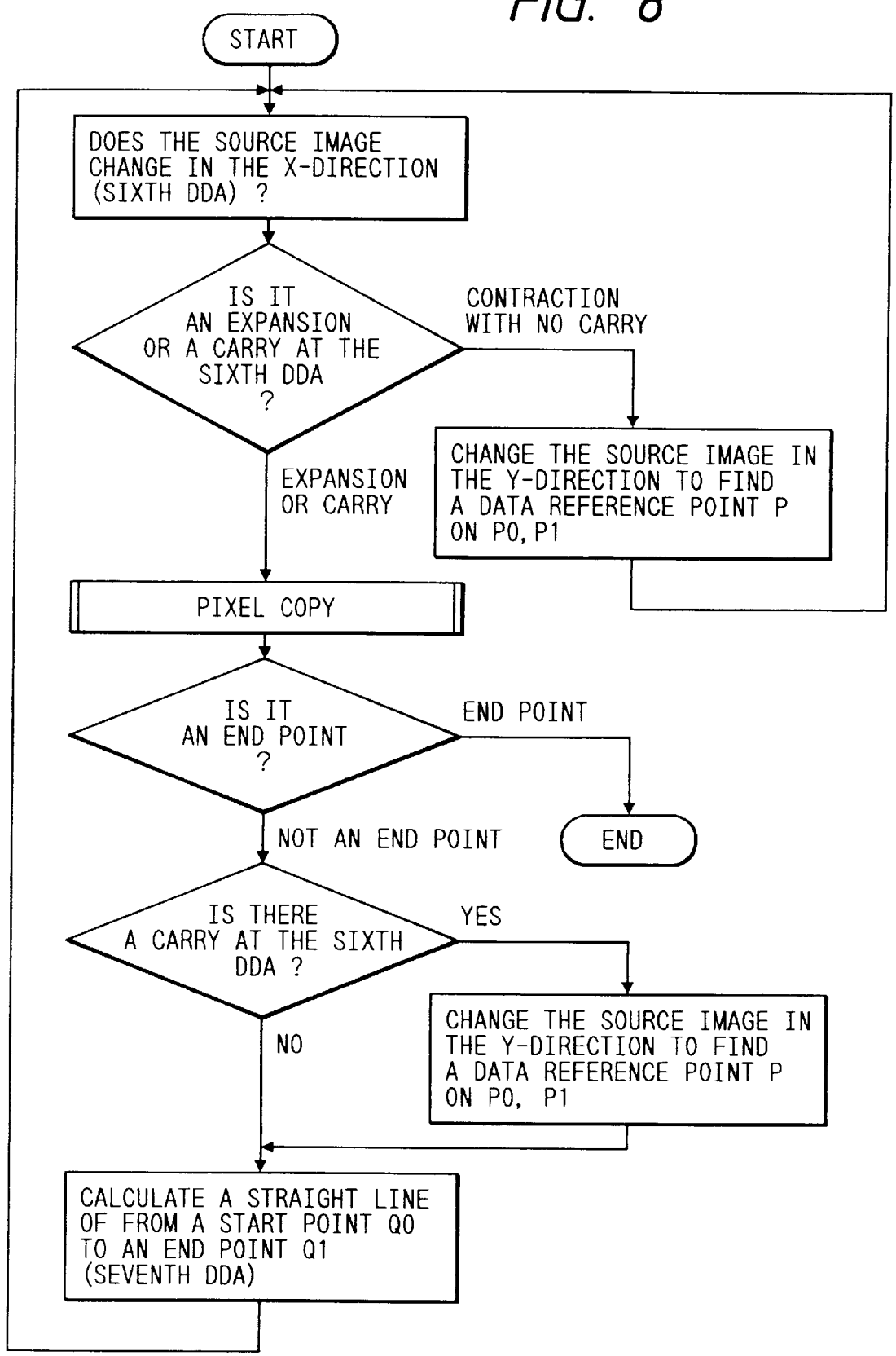
FIG. 8 illustrates an algorithm for straight line operation.

The straight line operation algorithm is the one for operating coordinates of a straight line that connects a given point on the left side of the destination to a given point on the right side corresponding thereto. This is done by executing the sixth and the seventh DDAs according to the flow chart of FIG. 8 to find coordinates of the line copy according to the start point and the end point found by the side operation.

The pixel copy algorithm is the one for copying a pixel of a source image onto a pixel of the destination. This is to execute the memory access for a set of source pixel and destination pixel found by the side operation and the straight line operation.

Figure 10A:
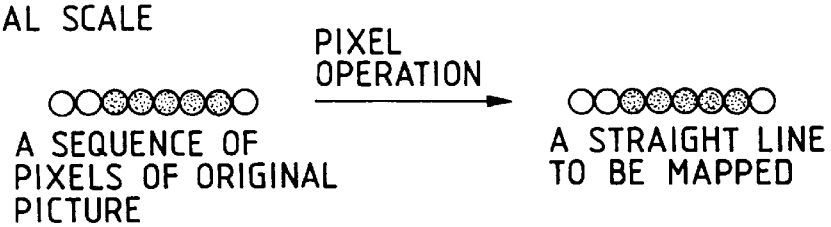
FIG. 10 illustrates an example of texture mapping.
Figure 10B:
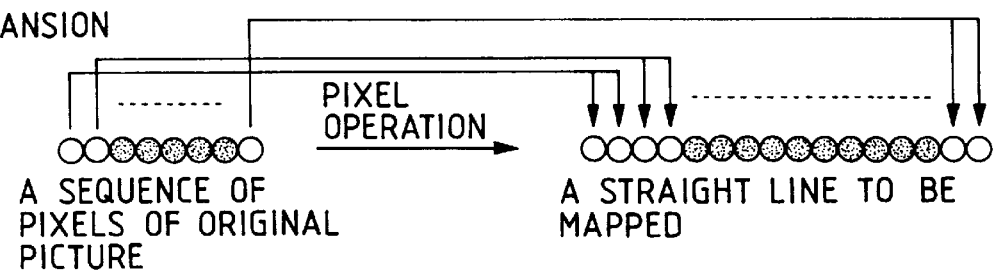
Figure 10C:
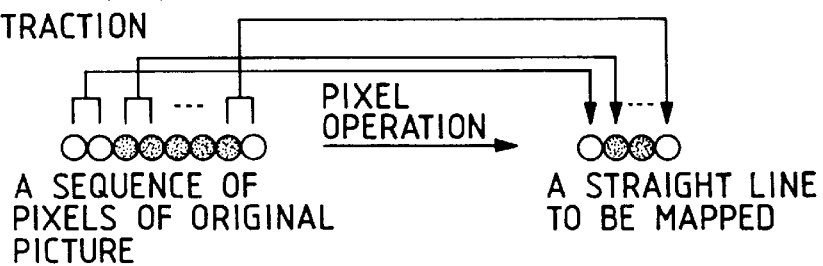

FIG. 10 illustrates loci of when the texture mapping draw algorithms are executed by the data processor of the present invention. When the image is to be expanded, a pixel of the source image is copied several times depending upon the expansion. When the image is to be contracted, the source image is copied in a reduced number of times depending upon the contraction.

The shading is an easy method of solid expression of an image, i.e., is a primitive image operation for smoothly changing the hue and brightness of image. In the data processor of the present invention, the shading is defined as a function for smoothly changing the hue.

The shading by the data processor of the present shading colors ($\Delta R$, $\Delta G$, $\Delta B$) are added to the colors (R, G, B) of pixels of the destination depending upon the color components to obtain new colors (R+$\Delta R$, G+$\Delta G$, B+$\Delta B$) of pixels of the destination. According to the present invention, the data processor executes the shading for any square shape at the destination which is the result of texture mapping when the texture mapping is being executed. The shading colors of pixels in any square shape are calculated based upon shading colors (Ra, Ga, Ba), (Rb, Gb, Bb), (Rc, Gc, Bc), (Rd, Gd, Bd) designated at four vertexes of any square shape ABCD on the destination.

It is a prerequisite that the shading is executed simultaneously with the texture mapping. Shading colors of pixels of the right and left sides of the destination are found through the side operation, and shading colors of pixels of the line copy are found through the linear operation. Pixels of the destination and shading colors found are added up together when the pixels are being copied.

Here, the color data should be absolute values of color components of red, green and blue.

According to the data processor of the present invention, the above-mentioned shading is realized by using nine DDAs. Among the nine DDAs, six DDAs are used for finding shading colors at a start point Q0 and an end point Q1 of the line copy, and three DDAs are used for finding a shading color of a straight line connecting Q0 and Q1. In the data processor of the present invention, the former operation is defined to be a side shading color operation and the latter operation is defined to be a straight line shading color operation.

Figure 11:
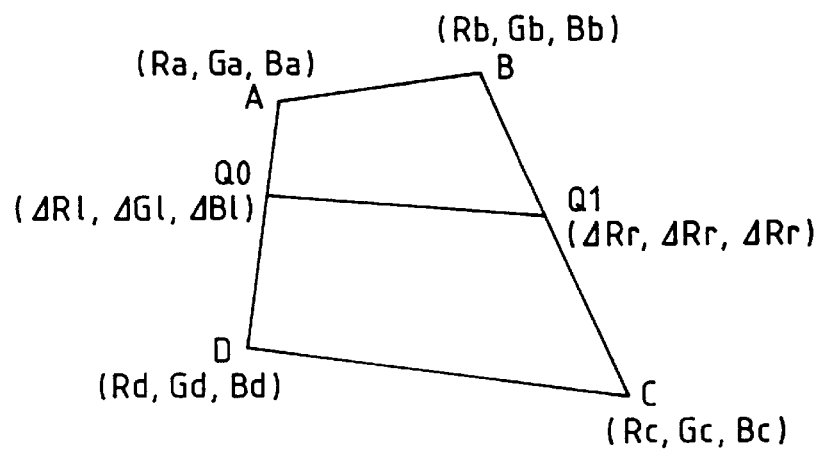
FIG. 11 is a diagram schematically illustrating a shading processing.

The roles of the nine DDAs will now be described with reference to FIG. 11.

The eighth DDA is the one for operating the shading red color of the right side, i.e., the one for a shading red color difference $\Delta Rr$ between vertexes B and C and for a component MAXEDGER having a maximum inter-pixel distance of the X-direction component or the Y-direction component of the right side of the destination image. This DDA performs the operation based on either the $\Delta Rr$ or the inter-pixel distance MAXEDGER which is larger.

The ninth DDA is the one for operating the shading green color of the right side, i.e., the one for a shading green color difference $\Delta Gr$ between vertexes B and C and for MAXEDGER. This DDA executes the operation based on either one of $\Delta Gr$ or MAXEDGER which is larger.

The tenth DDA is for operating the shading blue color of the right side, i.e., the one for a shading blue color difference $\Delta Br$ between vertexes B and C and MAXEDGER. This DDA performs the operation based on either $\Delta Br$ or MAXEDGER which is larger.

The eleventh DDA is the one for operating shading red color of the left side, i.e., the one for a shading red color difference $\Delta Rl$ between vertexes A and D and for a component MAXEDGEL having a maximum inter-pixel distance of the X-direction component or the Y-direction component of the left side of the destination image. This DDA performs the operation based on either $\Delta Rl$ or the inter-pixel distance MAXEDGEL which is larger.

The twelfth DDA is the one for operating shading green color of the left side, i.e., the one for a shading green color difference $\Delta Gl$ between vertexes A and D an for MAXEDGEL. This DDA performs the operation based on either $\Delta Gl$ or MAXEDGEL which is larger.

The thirteenth DDA is the one for operating shading blue color of the left side, i.e., the one for a shading blue color $\Delta Bl$ between vertexes A and D and for MAXEDGEL. This DDA performs the operation based on either $\Delta Bl$ or an inter-pixel distance of MAXEDGEL which is larger.

The fourteenth DDA is the one for operating shading red color of the straight line, i.e., the one for a shading red color difference $\Delta Rq$ which is a difference in the shading red color between a start point Q0 and an end point Q1 of destination image found by side operation and for a component MAXLINE having a maximum inter-pixel distance of an X-direction component or a Y-direction component of a straight line between the start point Q0 and the end point Q1. This DDA performs the operation based on either $\Delta Rq$ or MAXLINE which is longer.

The fifteenth DDA is the one for operating shading green color of the straight line, i.e., the one for a shading green color difference $\Delta Gq$ between the start point Q0 and the end point Q1 and for MAXLINE. This DDA performs the operation based on either $\Delta Gq$ or MAXLINE which is longer.

The sixteenth DDA is the one for operating shading blue color operation of the straight line, i.e., the one for a shading blue color difference $\Delta Bq$ between the start point Q0 and the end point Q1 and for MAXLINE. This DDA performs the operation based on either ΔBq and MAXLINE which is longer.

Described below is the constitution of shading draw algorithms by the data processor of the present invention.

According to the data processor of the present invention, the shading draw algorithms are divided into three depending upon the functions, i.e., a side shading color operation algorithm, a straight line shading color operation algorithm and a shading color addition algorithm.

Figure 12:
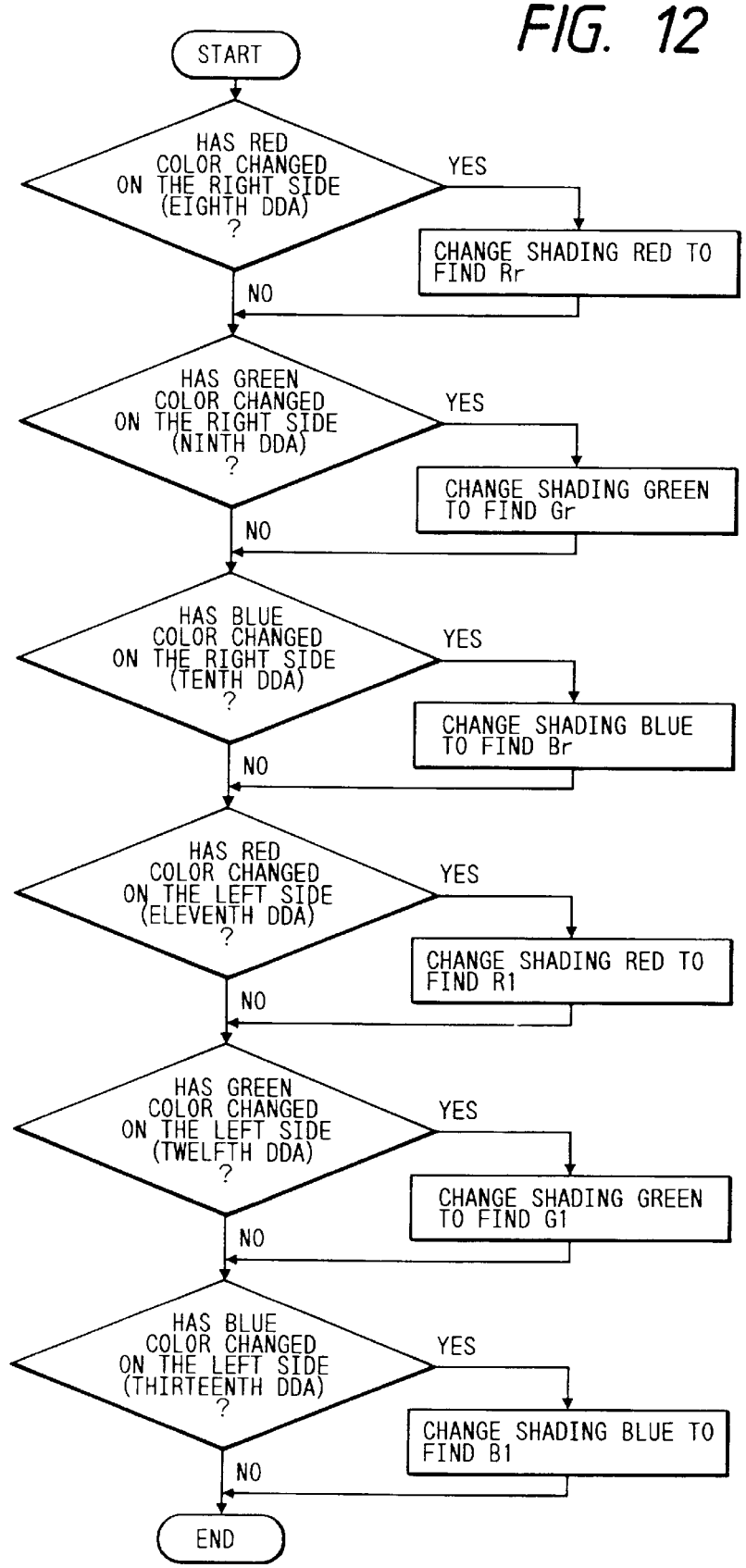
FIG. 12 illustrates an algorithm for side shading.

The side shading color operation algorithm is the one for operating shading colors of the left side and of the right side of the destination. This is done by executing the above-mentioned eighth to thirteenth DDAs in accordance with a flow chart of FIG. 12 to find shading colors at a start point Q0 and at an end point Q1 of the line copy.

Figure 13:
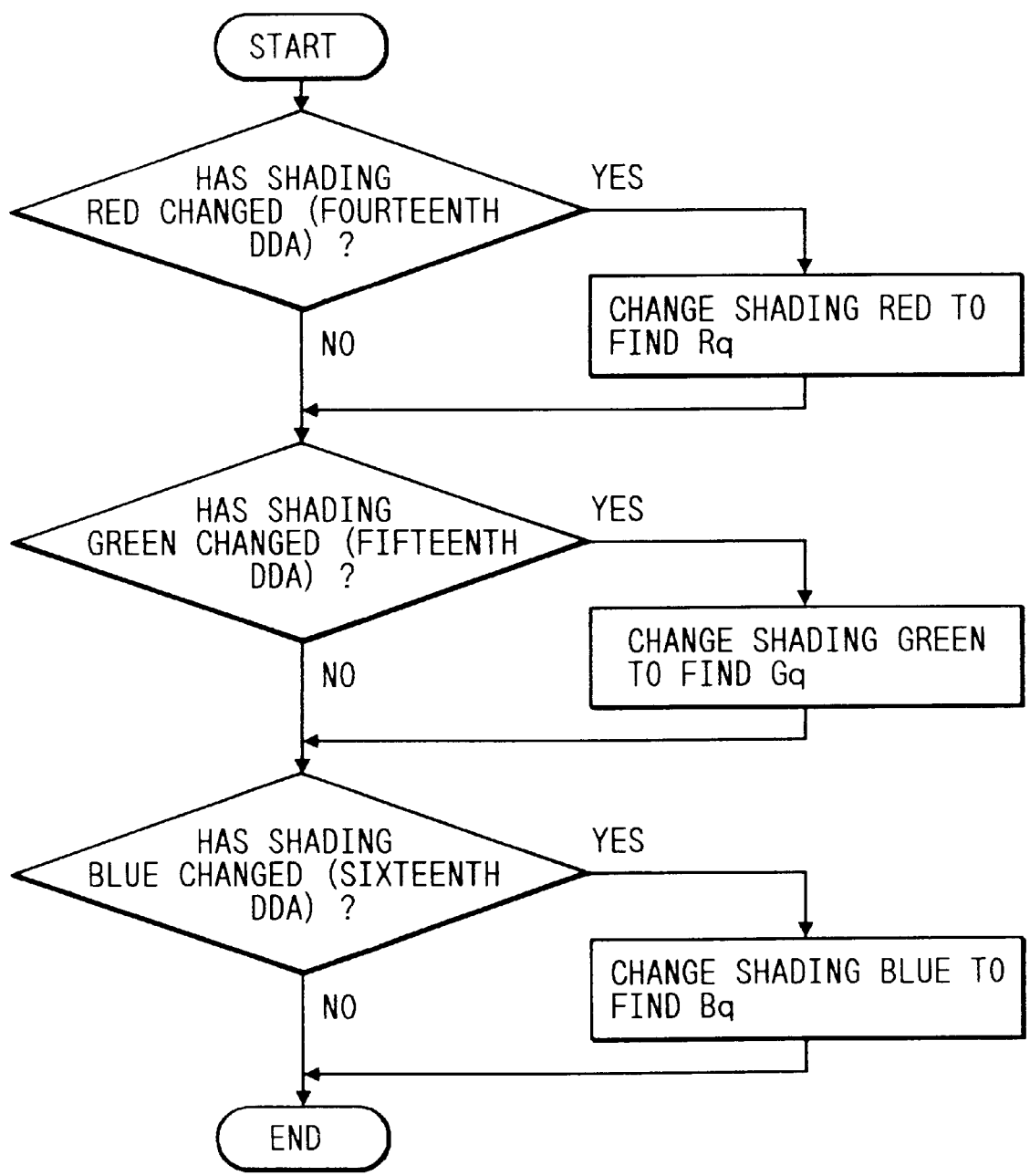
FIG. 13 illustrates an algorithm for straight line shading.

The straight line shading color operation algorithm is the one for operating a shading color of a straight line connecting a given point on the left side of the destination to a corresponding point on the right side. This is done by executing the fourteenth to sixteenth DDAs in accordance with a flow chart of FIG. 13 to find shading colors of pixels of the line copy according to the start point Q0 and the end point Q1 found by the side operation.

Figure 9:
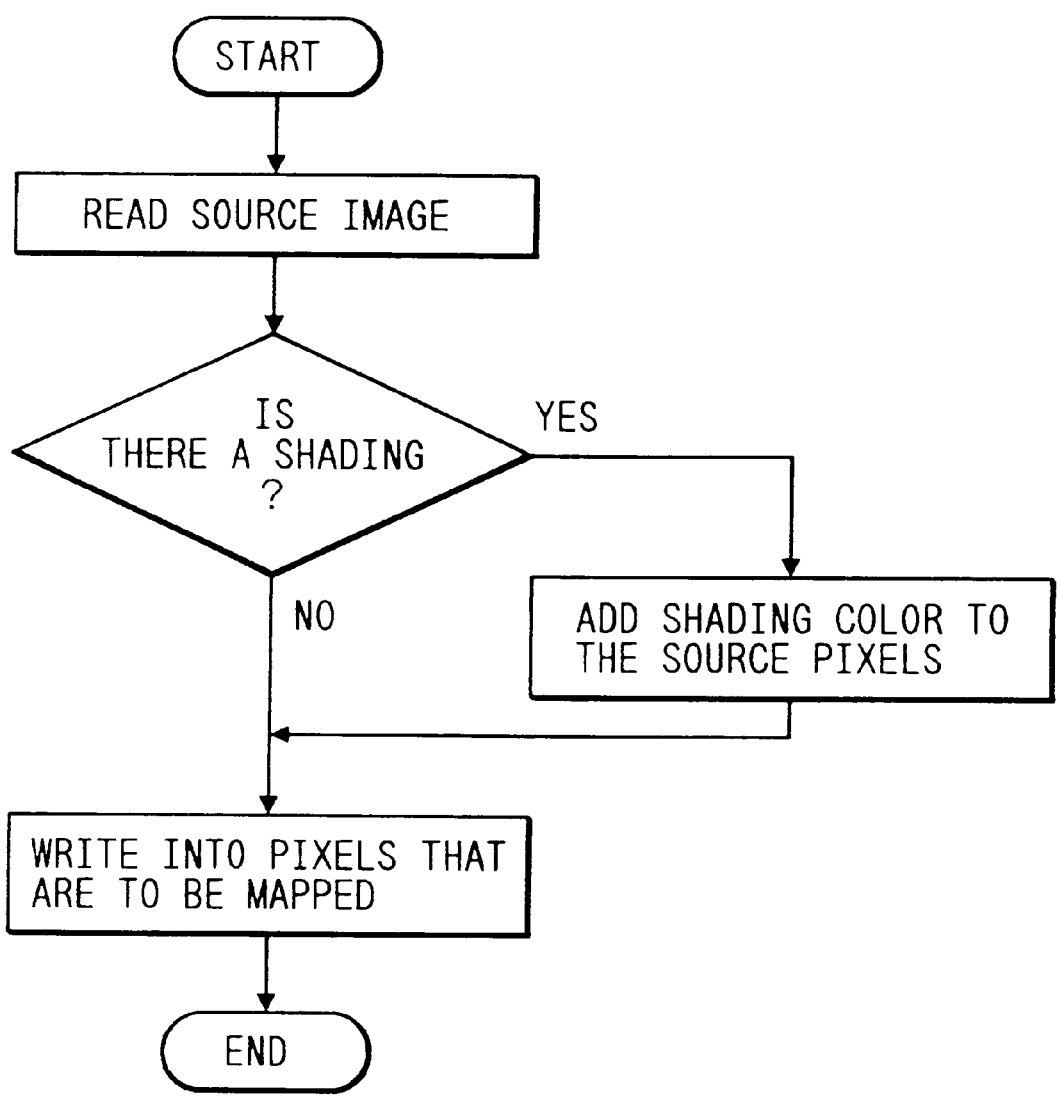
FIG. 9 illustrates an algorithm for pixel operation.

The shading color addition algorithm is the one for adding the shading colors obtained above to the pixels. This is done by executing the addition of shading color for the destination in accordance with the flow chart shown in FIG. 9.

Described below are the units for realizing the above-mentioned texture mapping draw algorithms. The draw processor 7 is constituted by a data control unit 11, a side operation unit 12, a straight line operation unit 13 and a pixel operation unit 14.

The data control unit 11 is a module for fetching draw commands and draw parameters from the draw source data/draw command SDRAM. The commands and parameters that are fetched are stored in the internal registers in the side operation unit 12 and in the pixel operation unit 14.

The side operation unit 12 is a module for executing a side draw algorithm, and interprets the draw command, executes the side operation according to a draw parameter, and stores the result of side operation in the internal register in the straight line operation unit 13. Among them, the side operation executes a total of eleven DDAs from the first to fifth DDAs and from the eighth to thirteenth DDAs in order to find source coordinates P0, P1 destination coordinates Q0, Q1, and shading colors (R0, G0, B0), (R1, G1, B1) of the destination coordinates Q0 and Q1.

Figure 14:
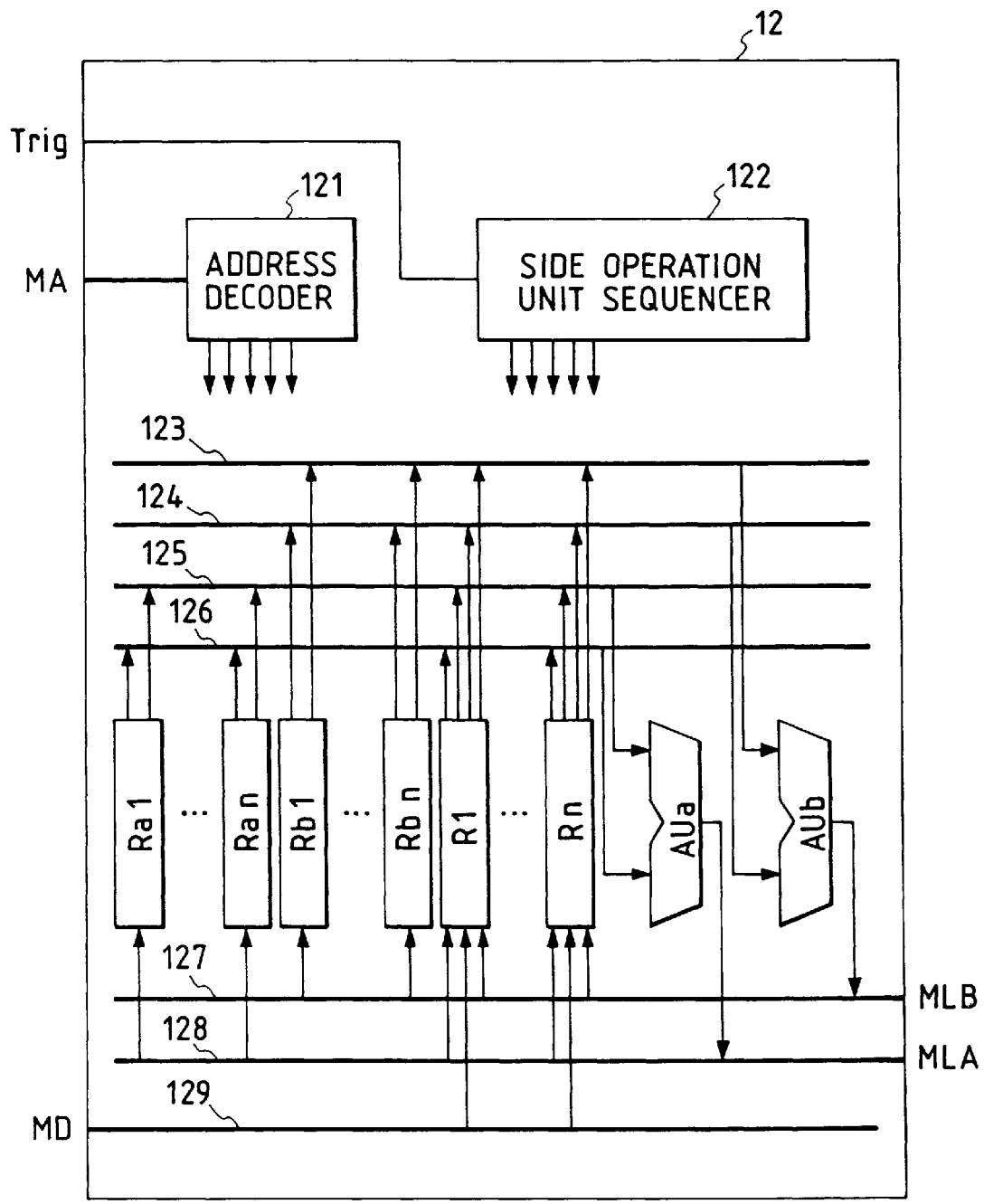
FIG. 14 is a block diagram of a side operation unit.

Referring to FIG. 14, the side operation unit 12 is constituted by two 13-bit AUs having dedicated read and write buses, a 13-bit register common to these two AUs, and 13-bit registers exclusively for each of these AUs. The two AUs are denoted as AUa and AUb, respectively. In order to efficiently use the two AUs, these two AUs are operated in two states, i.e., synchronous operation and independent operation.

The synchronizing operation is the one in which the two AUs are controlled by the same sequencer. The two AUs have a common register, and the result operated by AUa is used later by AUb and the result operated by AUb is used later by AUa. The interpretation of draw command and the first to third DDAs are operated in this operation state.

The independent operation is the one in which the two AUs are controlled by separate sequencers. The two AUs have their own dedicated registers, and the result operated by AUa cannot be used later by AUb and the result operated by AUb cannot be used later by AUa. The fourth and fifth DDAs, and the eighth to thirteenth DDAs are operating in this operation condition. The fourth DDA and the eighth to tenth DDAx, and the fifth DDA and the eleventh to thirteenth DDAs are operated in parallel by AUa and AUb, respectively.

The straight line operation unit 13 is a module for executing straight line draw algorithms, and executes the straight line operation depending upon the results of side operation stored by the side operation unit 12. The straight line operation is executed by a total of five DDAs, i.e., the sixth and seventh DDAs and the fourteenth to sixteenth DDAs. The result of DDA operation is used as an increment signal during the pixel operation by the pixel operation unit.

Figure 15:
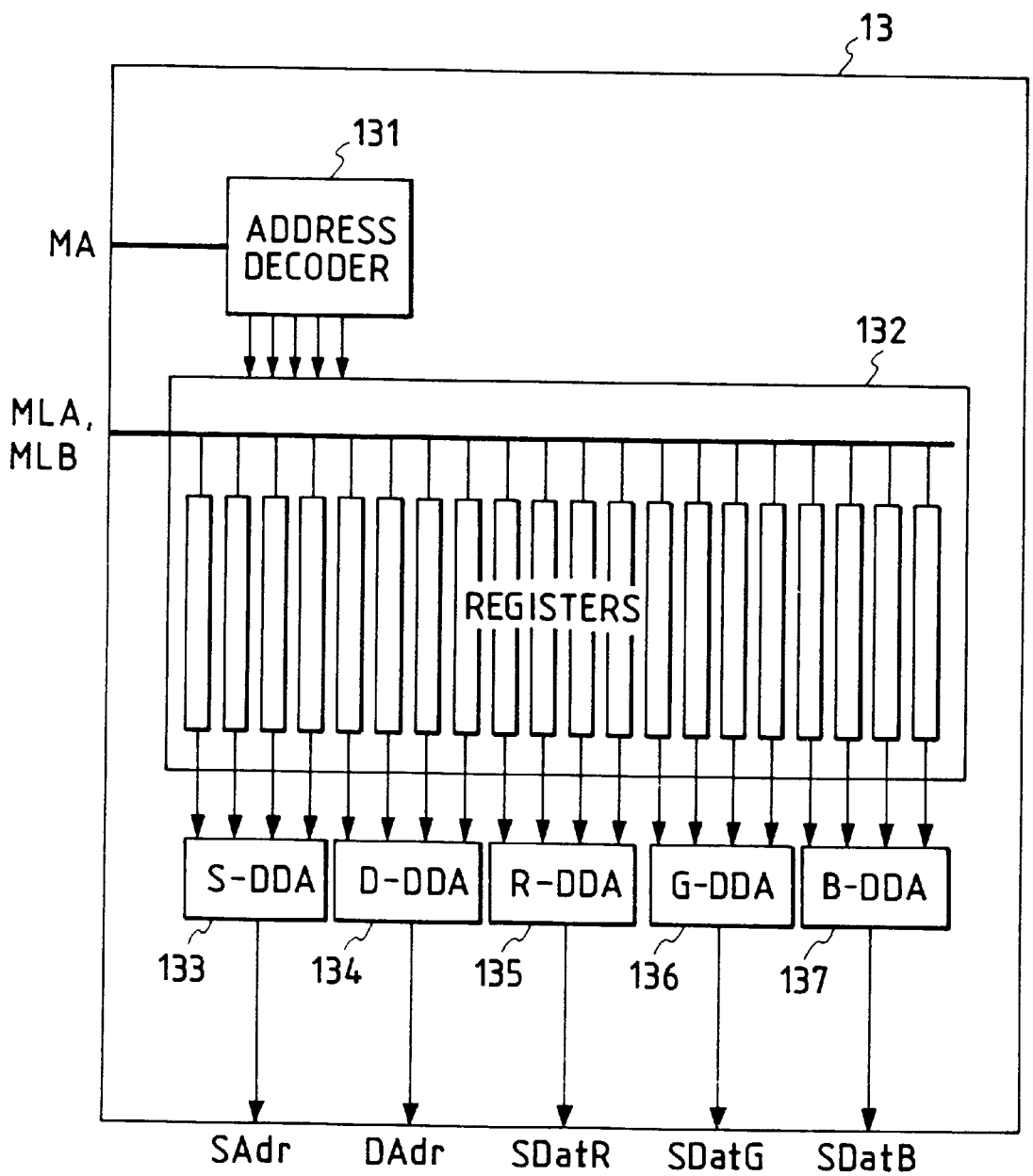
FIG. 15 is a block diagram of a straight line operation unit.

Referring to FIG. 15, the straight line operation unit 13 is constituted by five DDA hardware units that execute DDA operation in one cycle and by a group of 13-bit registers. The group of 13-bit registers is storing parameters at the start point and end point of line copy sent from the side operation unit. In response to the parameters, five DDA hardware units perform sixth and seventh, and fourteenth to sixteenth DDA operations. They operate in parallel to execute DDA operation of one pixel in one cycle.

The pixel operation unit 14 is a module that executes pixel copy algorithms, and performs pixel operation of address and data for each SDRAM in accordance with the result of straight line operation, source data read access to the SDRAM for draw source data/draw command, pixel operation, and write access to the frame buffer SDRAM of the result of pixel operation. The pixel operation is to find source coordinate P of a pixel on the line copy, destination coordinate Q, and shading colors (R, G, B) of destination coordinate Q, which can be found by increment from the initial value.

Figure 16:
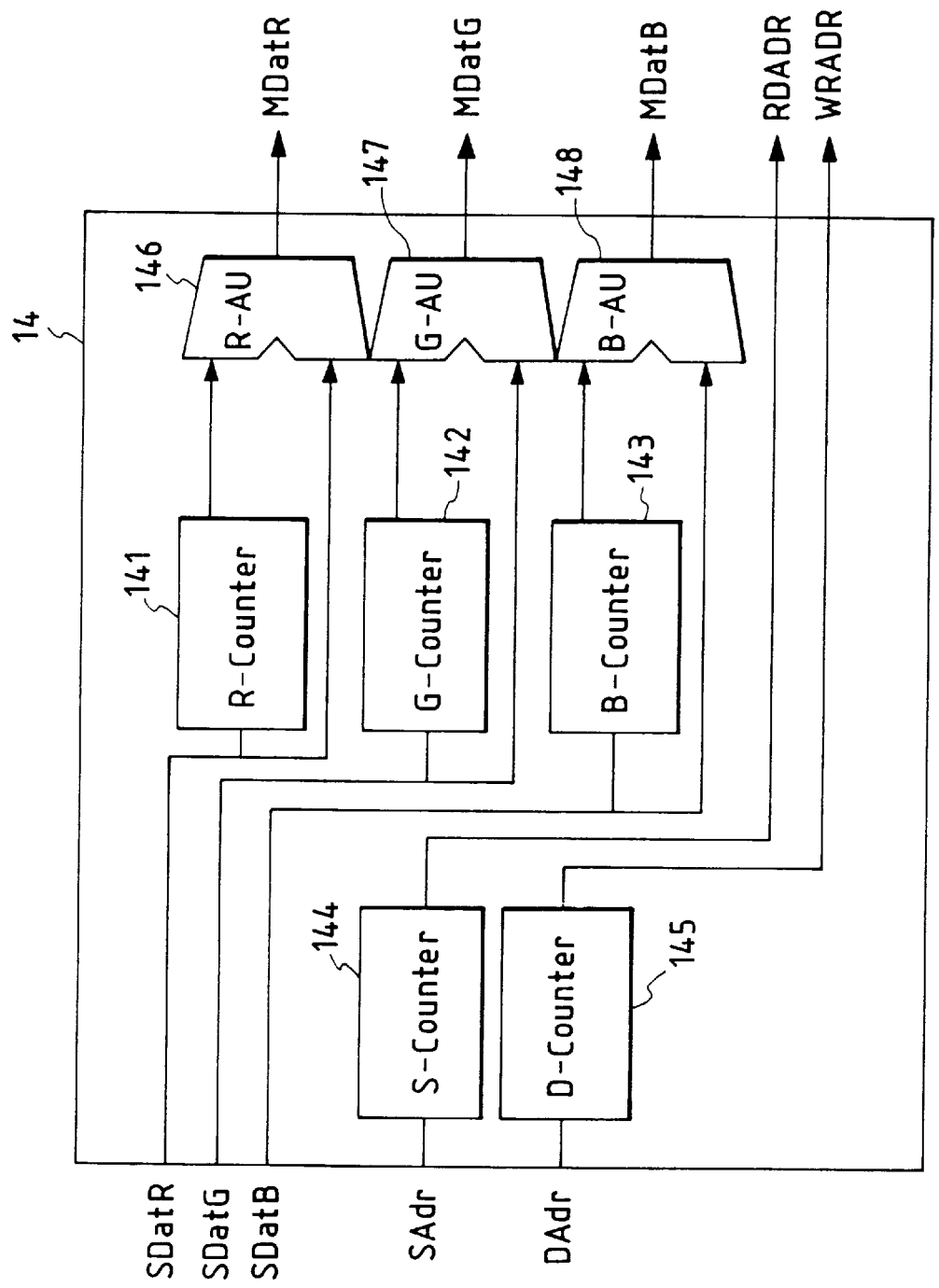
FIG. 16 is a block diagram of a pixel operation unit.

Referring to FIG. 16, the pixel operation unit 14 is constituted by a source memory address counter 144, a destination memory address counter 145, 5-bit counters 141, 142 and 143 corresponding to shading red, green and blue, and 5-bit AUs 146, 147 and 148 having dedicated read and write buses. The source memory address counter 144 and the destination memory address counter 145 correspond to sixth and seventh DDAs. When a carry takes place as a result of these DDA operations, the address is counted up. The three 5-bit counters correspond to the fourteenth to sixteenth DDAs. When a carry takes place as a result of these DDA operations, the shading color data is counted up. The three 5-bit AUs add shading red, green and blue formed by the 5-bit counters to the source data red, green and blue, respectively.

Figure 17A:
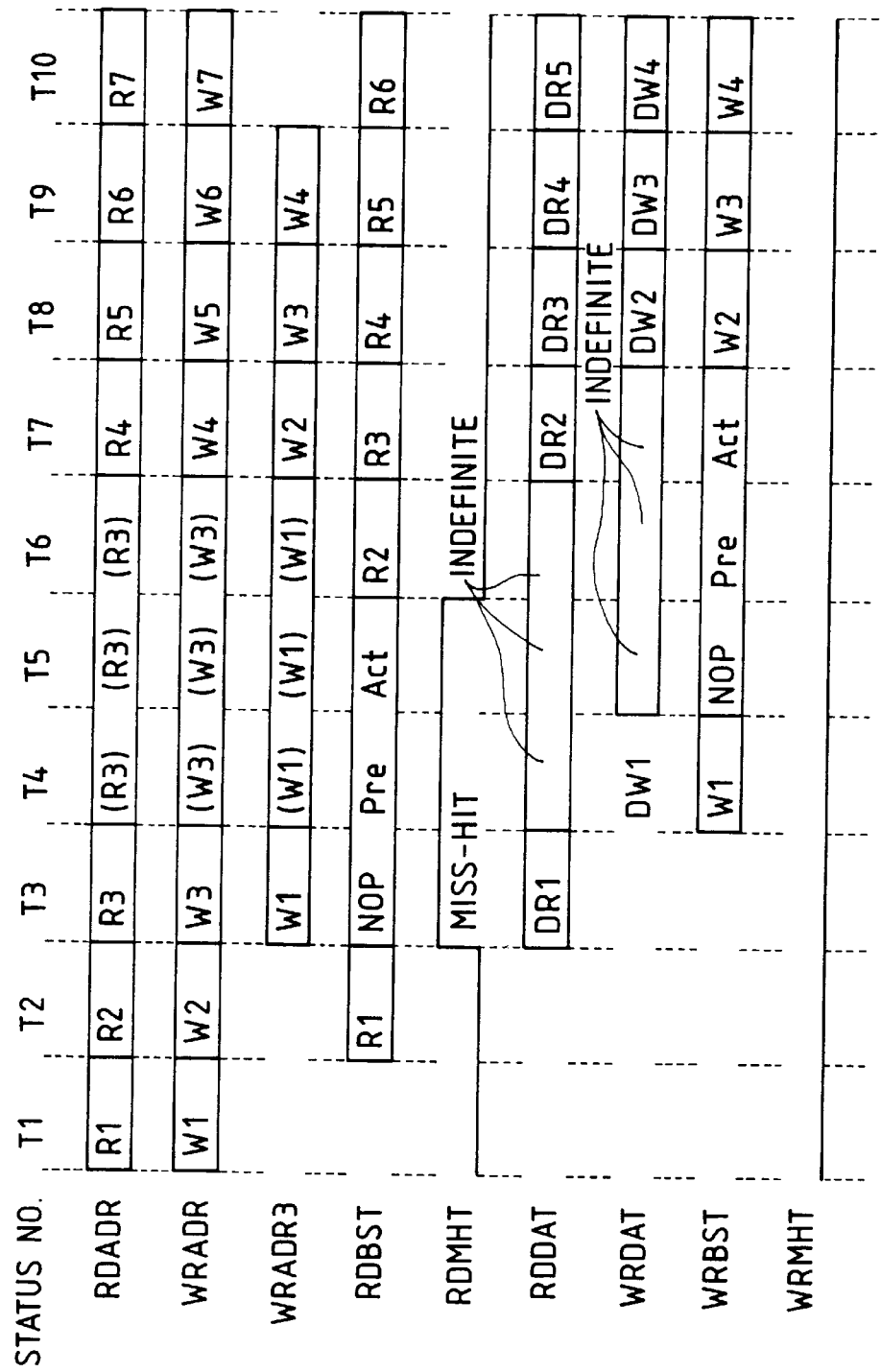
FIG. 17 is a timing chart of miss-hit processing.

FIG. 17 is a timing chart in the bus control unit. FIG. 17(a) illustrates an example of miss-hit during the reading. The read address RDADR issued at T1 from the pixel operation unit 14 is sent to the bus control unit 16 which changes the status RDBST of the sequencer into a first data read R1 at T2. Then, the data DR1 is input to T3 from the synchronous DRAM 3. The DR1 is processed through the pixel operation unit 14 and turns into data DW1. The write address WRADR turns into WRADR3 being delayed through a delay unit that is not shown, and the status WRBST of the sequencer of the bus control unit 17 is changed into a first data writing W1 at T4.

Here, when R2 of the read address RDADR to be read out next is different from the line address of R1, a miss-hit processing is necessary to precharge the line address again and to activate the line address. When R2 is issued as RDADR in T2 state, a miss-hit detection unit that is not shown in bus control unit 16 compares it with the line address of R1. When they are not the same, a miss-hit signal RDMHT is issued. Based upon this signal, addresses such as RDADR, WRADR AND WRADR3 are not updated through the periods of from T4 to T6, the previous address is held, and the pixel operation unit 14 remains stopped. When a miss-hit occurs at the start of reading, the write data does not effectively continue, and the write bus control unit becomes idle during the periods of from T5 to T7.

FIG. 17(b) illustrates an example where a miss-hit occurs at the start of writing. It is now presumed that a write address WRADR issued from the pixel operation unit 14 at T2 is miss-hit. If the write address that is miss-hit is detected at a moment of writing the data, then, the miss-hit is discerned in a T4-state. Therefore, if the address is stopped in a T5-state, the write address and data are fed in succession and extinguish. Therefore, the write addresses are detected for their miss-hit at the same timings as the read addresses and are permitted to stay idle while the reading is being processed in order to maintain a time for processing the write miss-hit.

Figure 18:
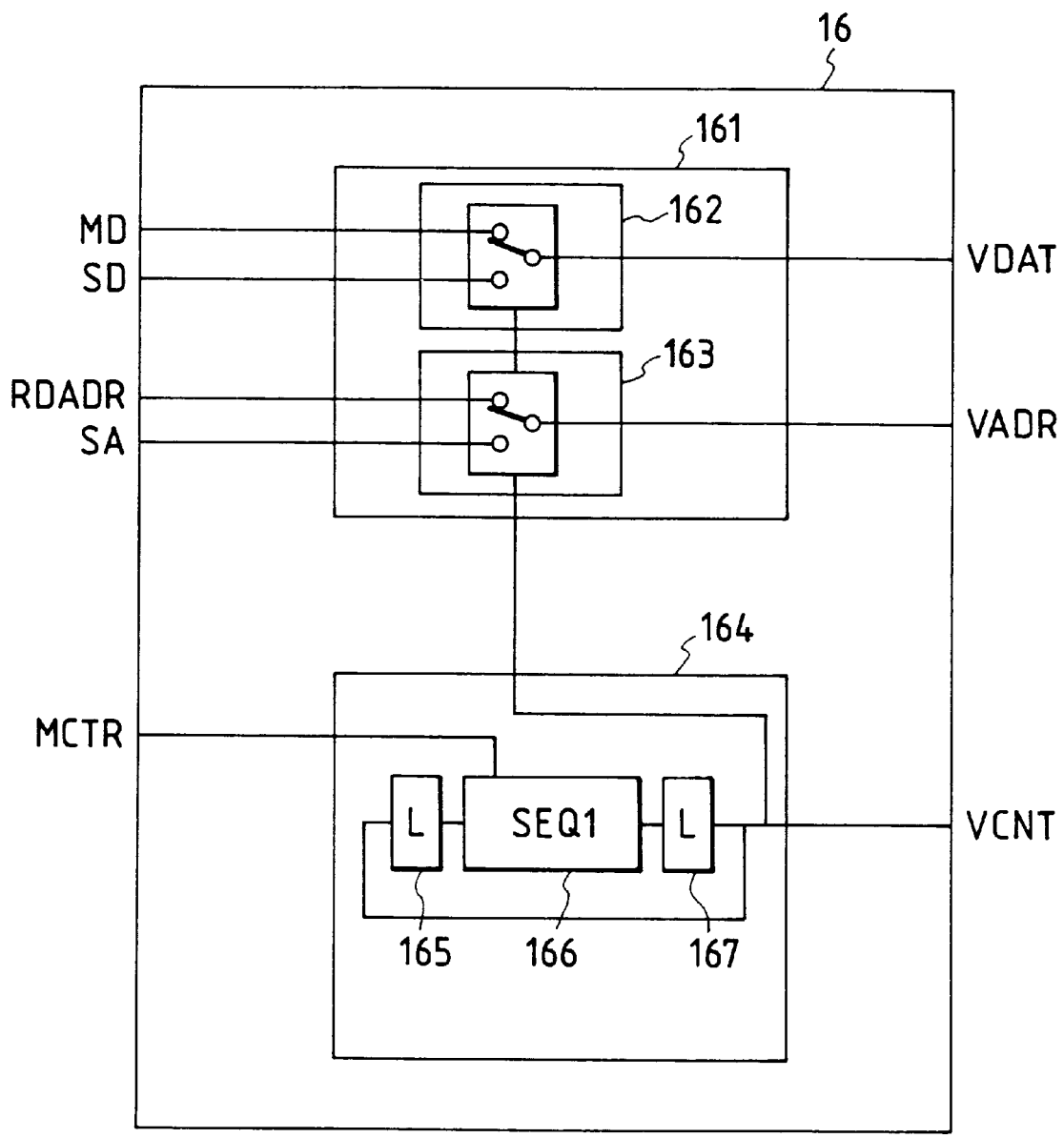
FIG. 18 is a block diagram of a bus control unit.

FIG. 18 is a diagram illustrating internal blocks of the bus control unit 16. The data bus SD and address bus SA from the data control unit 11, and the data bus MD and address bus RDADR from the pixel operation unit 14 are switched by changer-over units 162 and 163 to form a data VDAT and an address bus VADR to the synchronous DRAM 3. The change-over units 162 and 163 are controlled by the memory control unit 164 which is constituted by a sequencer 166 and latches 165 and 167. The sequencer 166 is controlled by making reference to a memory control signal MCTR from the display unit 15 and the like signals. The output of the sequencer 166 is fed, via latch 167, to the synchronous DRAM 3 as a memory control signal VCNT. The bus control units 17 and 18 are also similarly constituted but having a different number of input buses and a different input/output direction, and are not described here.

Figure 19:
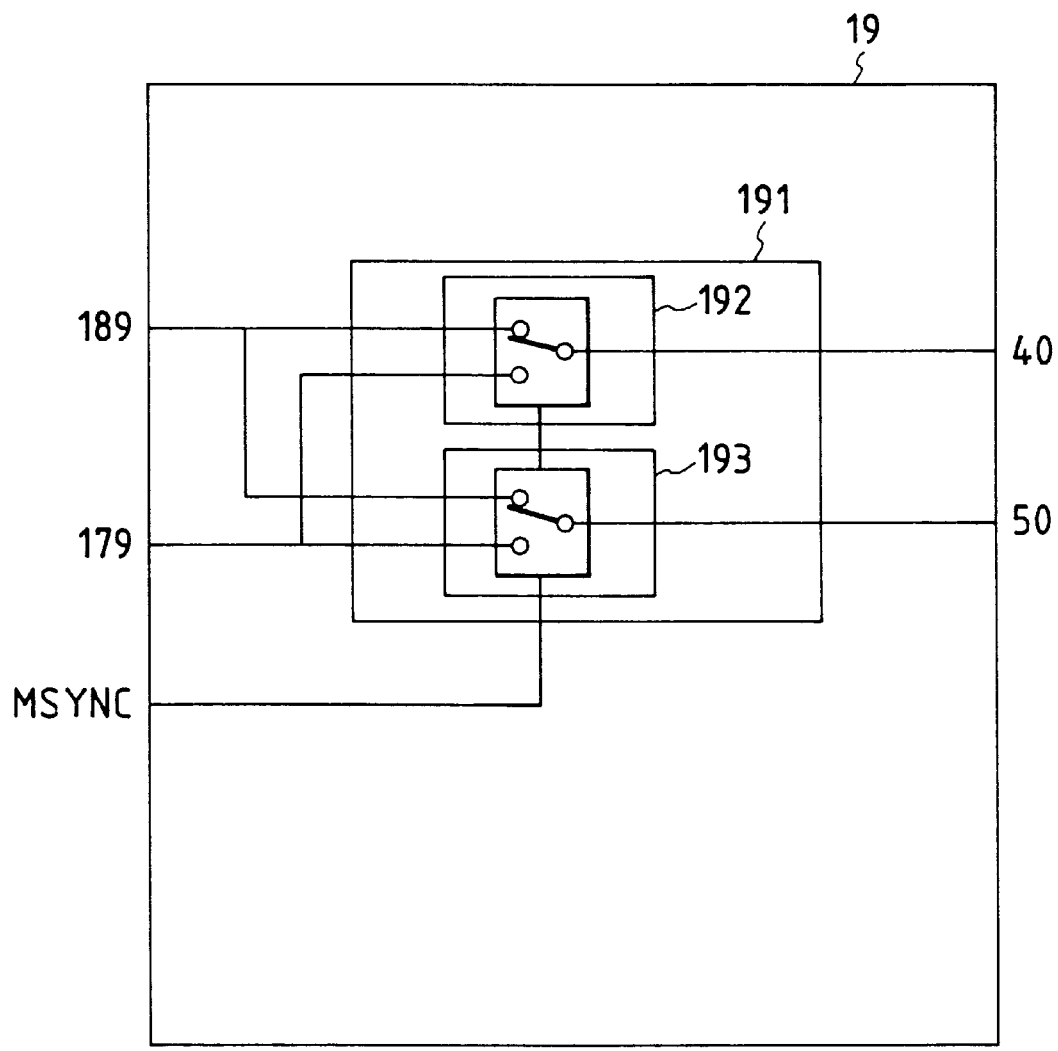
FIG. 19 is a block diagram of bus switches.

FIG. 19 illustrates the constitution of the change-over switch 19. The output 179 of the bus control unit 17 and the output 189 of the bus control unit 18 are changed over by switches 192 and 193 in a switch block 191. This is done in response to a memory change-over signal MSYNC from the display unit 15. The memory change-over signal MSYNC is formed based upon a vertical synchronizing signal VSYNC from the display unit. A maximum of throughput is realized by changing over the draw memory and the display memory for every frame.

Figure 20:
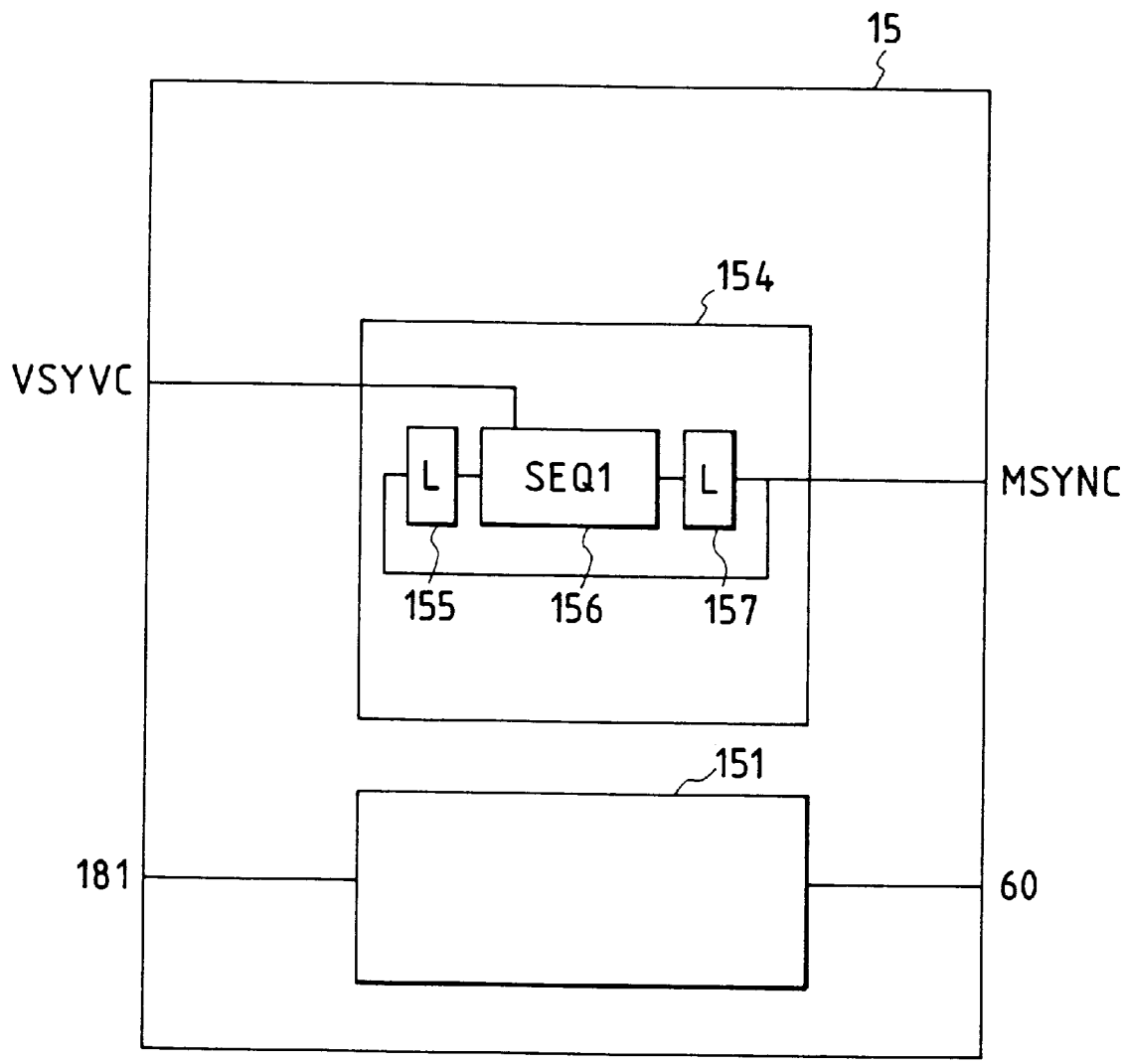
FIG. 20 is a block diagram of a display unit.

FIG. 20 is a block diagram of the display unit. The control unit 154 is constituted by a sequencer 156 and latches 155, 157, and the sequencer 156 produces a control signal in response to a vertical synchronizing signal VSYNC from an external unit and the like signals. A memory change-over signal MSYNC is included therein. The data 181 read out from the synchronous DRAM 4 or 5 selected by the change-over switch 19 is processed by a data conversion unit 151 depending upon the mode and is transferred to an external display synthesizer LSI 6 through bus 60.

By utilizing a plurality of synchronous DRAMs as described above, it is allowed to realize a maximum of throughput in a pipeline processing in which the processing is executed and the draw data are written while reading the commands and original picture data and, hence, to accomplish a data processing system of high performance at a reduced cost.

What is claimed is:

1. An image processor which is connected to a system bus that connects a processor for forming a graphic command related to image processing to a main memory, stores said graphic command and original image data in a graphic data memory, and draws an image in a frame buffer based upon said graphic command stored in said graphic data memory, wherein said processor has a data bus change-over unit which connects said system bus to a first data bus that is connected to said graphic data memory which holds said graphic command and said original image data, or connects said first data bus to the frame buffer which holds the data to be displayed.

2. An image processor according to claim 1, wherein said data bus change-over unit connects said first bus to said system bus to transfer said graphic command or said original image data to said graphic data memory from said main memory, or connects said first bus to said second bus to access data between said processor and said frame buffer.

3. An image processor according to claim 1 or 2, wherein said graphic data memory is a synchronous memory which inputs addresses in synchronism with clock signals, inputs and outputs data, and inputs control signals.

4. An image processor according to claim 1, wherein said frame buffer comprises a first frame buffer and a second frame buffer that alternatingly effect write processing for drawing and read processing for display, and the draw write processing and the display processing are changed over by said processor.

5. A data processing system comprising:

a processor for forming a graphic command related to image processing;

a main memory for holding program, command and original image data;

a graphic processor for drawing image based upon said graphic command from said processor;

a system bus for connecting said processor, said main memory and said graphic processor together;

a graphic data memory which is connected to said graphic processor, and holds said graphic command and said original image data;

a frame buffer for holding the data to be displayed;

a first data bus that connects said graphic processor to said graphic data memory; and a second data bus that connects said graphic processor to said frame buffer;

wherein said graphic processor has a data bus change-over unit that connects said first data bus to said system bus or connects first data bus to said second data bus.

6. A data processing system according to claim 5, wherein said data bus change-over unit connects said first bus to said system bus to transfer said graphic command or said original image data to said graphic data memory from said main memory, or connects said first bus to said second bus to access data between said graphic processor and said frame buffer.

7. A data processing system according to claim 5, wherein said graphic processor and said graphic data memory are constituted on a single semiconductor substrate.

8. A data processing system according to claim 5, wherein said graphic memory is a synchronous memory which inputs addresses in synchronism with clock signals, inputs and outputs the data, and inputs control signals.

9. A data processing system according to claim 5, wherein said frame buffer comprises a first frame buffer and a second frame buffer that alternatingly effect write processing for drawing and read processing for display, and the draw write processing and the display processing are changed over by said graphic processor.

10. A data processing system comprising:

first, second and third memories that latch row addresses, cause the latched row addresses to be consecutively accessed by updated column addresses, and input addresses, input and output data, and input control signals in synchronism with clock signals;

memory buses separately assigned to said first, second and third memories;

bus control means assigned to said memory buses; and first and second data processing modules coupled to said bus control means;

wherein said first data processing module and said second data processing modules are operated with different burst lengths.

11. A data processing system according to claim 10, wherein said first data processing module is operated with its burst length set to 1 and said second data processing module is operated with its burst length set to 8.

12. A data system comprising:

first, second and third memories that latch row addresses, cause the latched row addresses to be consecutively accessed by updated column addresses, and input addresses, input and output data, and input control signals in synchronism with the clock signals;

memory buses separately assigned to said first, second and third memories;

bus control means assigned to said memory buses;

a first data processing module that forms data and addresses for accessing said first, second and third memories coupled to said bus control means, in order to process the data read out from said first memory and to store the result of data processing in said second and third memories;

a second data processing module that forms a memory access address to read the data stored by said first data processing module from said second or third memory;

a means which executes the processing for updating the row address of said first memory when the row address output to said first memory from said first data processing module is different from the row address that is fed in the previous time; and a means which executes the processing for updating the row address of said second or third memory when the row address output to said second or third memory from said first data processing module is different from the row address that is fed in the previous time; wherein during a processing period for updating the row address of the first memory, a processing is executed to put said second or third memory to be inoperative or to update the row address in a delay time from when the data is read out from the first memory up to when the data is stored in said second or third memory, and the processing is executed to put said first memory to be inoperative or to update the row address at a timing earlier by a delay time of from when the data is read out from said first memory up to when the data is stored in said second or third memory during the processing period for updating the row address of said second or third memory.

13. An image processor which connects to a first data line that connects a CPU for forming graphic commands related to image processing and a first memory that stores commands and image data, connects to a second data line that connects a second memory that stores said commands and image data, and connects to a third data line that connects a third memory that stores display data, wherein said image processor transfers the commands and image data from said CPU to said second memory, generates said display data based on said commands and image data stored in said second memory and outputs said display data to said third memory.

14. An image processor according to claim 13, wherein said first through third data lines are buses, said first memory is a main memory, said second memory is a local memory, said third memory is a frame buffer, said image data is source image data, said image processor transfers the commands and image data from said CPU to said local memory in advance.

15. An image processor according to claim 14, wherein a data bus change-over unit connects said first bus to said second bus to transfer said graphic command or said original image data to said local memory from said main memory, or connects said third bus to said second bus to access data between said image processor and said frame buffer.

16. An image processor according to claim 13 or 14, wherein said local memory is a synchronous memory which inputs addresses in synchronism with clock signals, inputs and outputs data, and inputs control signals.

17. An image processor according to claim 14, wherein said frame buffer comprises a first frame buffer and a second frame buffer that alternatingly effect write processing for drawing and read processing for display, and the draw write processing and the display processing are changed over by said image processor.

18. A processor which is connected to a first data line that connects a CPU to a first memory, is connected to a second data line that connects a second memory, is connected to a third data line that connects a third memory and is connected to a fourth data line that connects a fourth memory, said processor comprises:

a first data processing module for processing data read from said second memory and writing said processed data to said third memory or said fourth memory;

a second data processing module for processing data read from said third memory or said fourth memory, wherein said processor transfers data from said first data line to said second memory, and operates said first data processing module and said second processing module in the different burst length.

19. A processor according to claim 18, wherein said first data processing module is operated with a burst length of 1 and said second data processing module is operated with a burst length of 8.

20. An image processor according to claim 14, wherein said second bus connects only said local memory.

* * * * *